United States Patent
Li et al.

(10) Patent No.: US 11,526,967 B2
(45) Date of Patent: Dec. 13, 2022

(54) SYSTEM AND METHOD FOR PRECISE IMAGE INPAINTING TO REMOVE UNWANTED CONTENT FROM DIGITAL IMAGES

(71) Applicant: Samsung Electronics Co., Ltd., Suwon-si (KR)

(72) Inventors: Wenbo Li, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/950,835

(22) Filed: Nov. 17, 2020

(65) Prior Publication Data

US 2021/0158491 A1    May 27, 2021

Related U.S. Application Data

(60) Provisional application No. 62/940,147, filed on Nov. 25, 2019.

(51) Int. Cl.
  *G06T 5/00*    (2006.01)
  *G06T 5/50*    (2006.01)

(52) U.S. Cl.
  CPC ........... *G06T 5/005* (2013.01); *G06T 5/50* (2013.01); *G06T 2207/20021* (2013.01); *G06T 2207/20221* (2013.01)

(58) Field of Classification Search
  CPC . G06T 5/005; G06T 5/50; G06T 2207/20021; G06T 2207/20221; G06K 9/628; G06V 10/32; G06V 10/82; G06V 10/26; G06V 10/454
  See application file for complete search history.

(56) References Cited

U.S. PATENT DOCUMENTS

| | | |
|---|---|---|
| 8,218,893 B2 | 7/2012 | Lim et al. |
| 8,355,593 B2 | 1/2013 | Jeong et al. |
| 8,363,967 B2 | 1/2013 | Mim et al. |
| 8,437,567 B2 | 5/2013 | Jeong et al. |
| 9,317,676 B2* | 4/2016 | Liu ................. G06F 16/583 |
| 9,378,583 B2 | 6/2016 | Lee et al. |
| 10,740,881 B2* | 8/2020 | Wang ............. G06V 10/454 |
| 11,055,828 B2* | 7/2021 | Long ............. G06K 9/6272 |
| 2013/0083965 A1 | 4/2013 | Joung et al. |

(Continued)

OTHER PUBLICATIONS

Hong et al., "Deep Fusion Network for Image Completion", arXiv.org, Apr. 2019, 13 pages.

(Continued)

*Primary Examiner* — Phuoc Tran

(57) ABSTRACT

An inpainting method includes retrieving image information at an electronic device, where the image information identifies an area within an image. The method also includes retrieving, using the electronic device, semantic information including a plurality of semantic classes and a semantic class distribution for each semantic class of the plurality of semantic classes. The method further includes generating semantic codes associated with different portions of the image based on the image information and the semantic information. In addition, the method includes constructing the area within the image by generating image content based on the semantic information.

21 Claims, 15 Drawing Sheets

(56) References Cited

U.S. PATENT DOCUMENTS

| | | |
|---|---|---|
| 2018/0158178 A1 | 6/2018 | Lee et al. |
| 2018/0197032 A1 | 7/2018 | Lee et al. |
| 2019/0057507 A1 | 2/2019 | El-Khamy et al. |
| 2019/0206088 A1 | 7/2019 | Duan et al. |

OTHER PUBLICATIONS

Yu et al., "Free-Form Image Inpainting with Gated Convolution", arXiv.org, Jun. 2018, 17 pages.
Yi et al., "Contextual Residual Aggregation for Ultra High-Resolution Image Inpainting", arXiv.org, May 2020, 10 pages.
Yu et al., "Generative Image Inpainting with Contextual Attention", arXiv.org, Jan. 2018, 10 pages.
Liu et al., "Image Inpainting for Irregular Holes Using Partial Convolutions", arXiv.org, Apr. 2018, 16 pages.
Berlincioni et al., "Road layout understanding by generative adversarial inpainting", Inpainting and Denoising Challenges, Oct. 2018, 18 pages.
Weng et al., "Conditional Image Repainting via Semantic Bridge and Piecewise Value Function", European Conference on Computer Vision, Aug. 2020, 16 pages.
Weng et al., "MISC: Multi-condition Injection and Spatially-adaptive Compositing for Conditional Person Image Synthesis", 2020, 9 pages.
Park et al., "Semantic Image Synthesis with Spatially-Adaptive Normalization", arXiv.org, Mar. 2019, 19 pages.
Ulyanov et al., "Deep Image Prior", arXiv.org, Nov. 2017, 23 pages.
"Segmentation I TensorFlow Lite", Oct. 2019, 6 pages.
"Gated Linear Units (GLU) and Gated CNN", Sep. 2020, 10 pages.
International Search Report and Written Opinion of the International Searching Authority dated Mar. 11, 2021 in connection with International Patent Application No. PCT/KR2020/016805, 8 pages.

\* cited by examiner

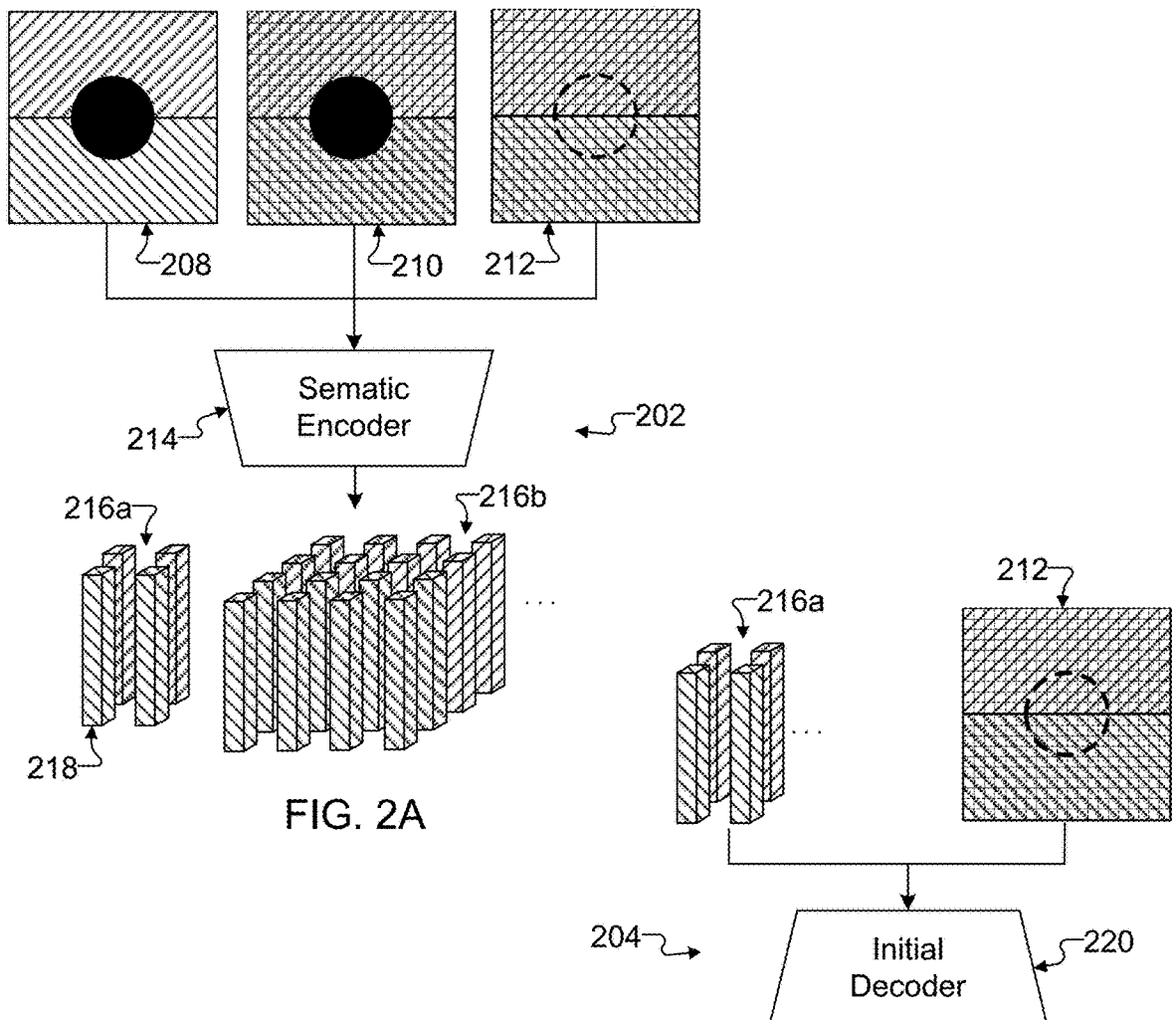
FIG. 2A
FIG. 2B
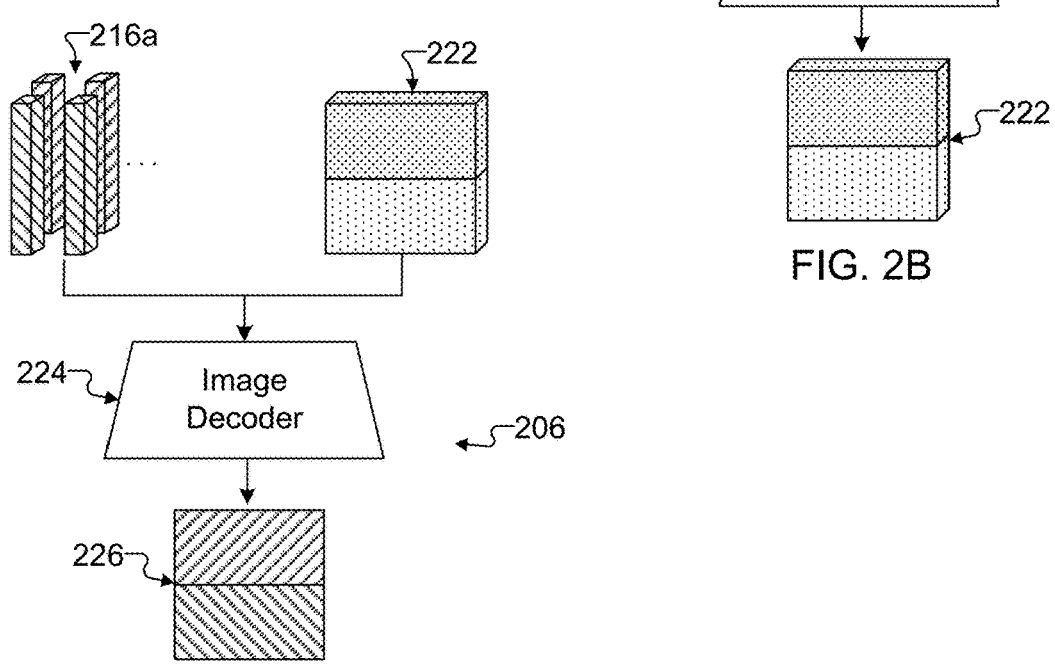
FIG. 2C

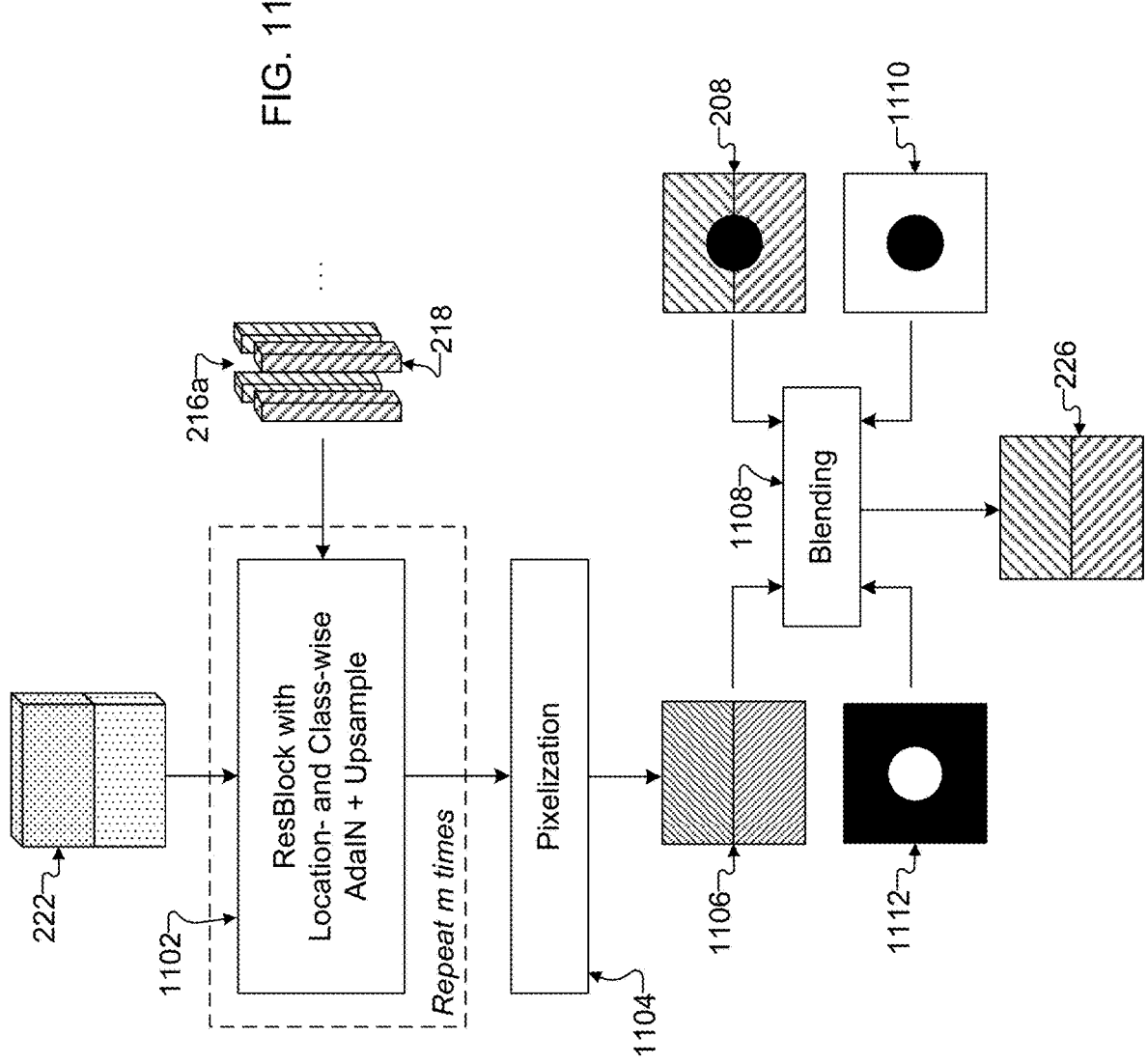

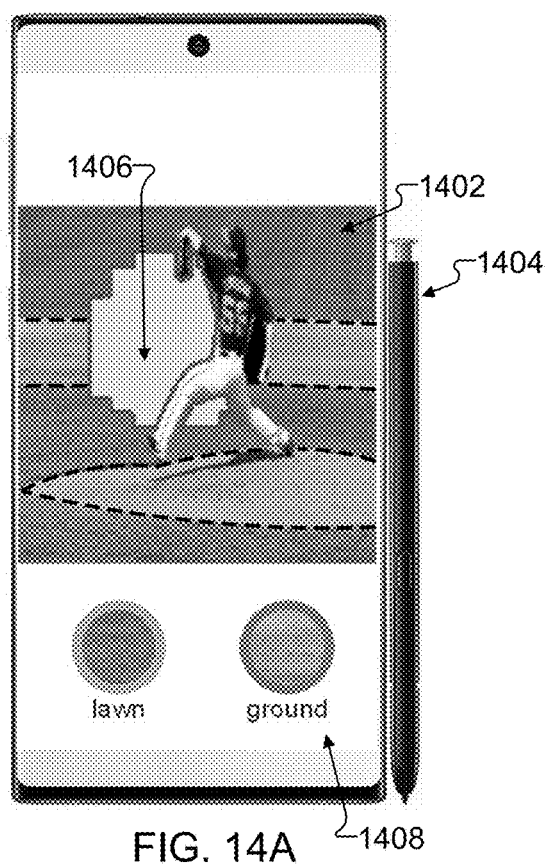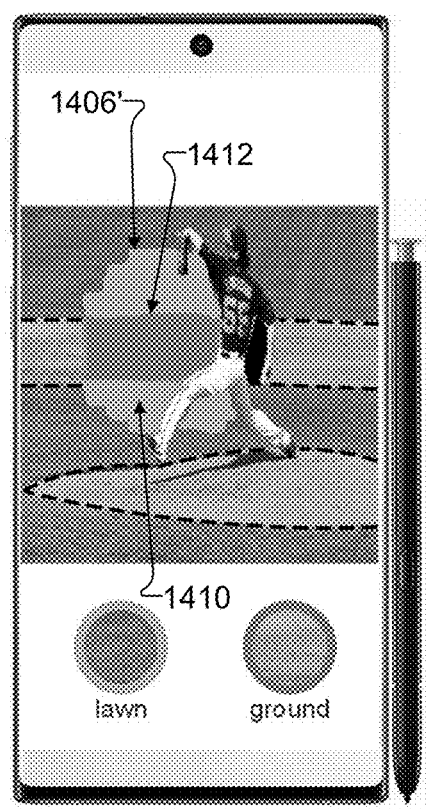
FIG. 14A  FIG. 14B
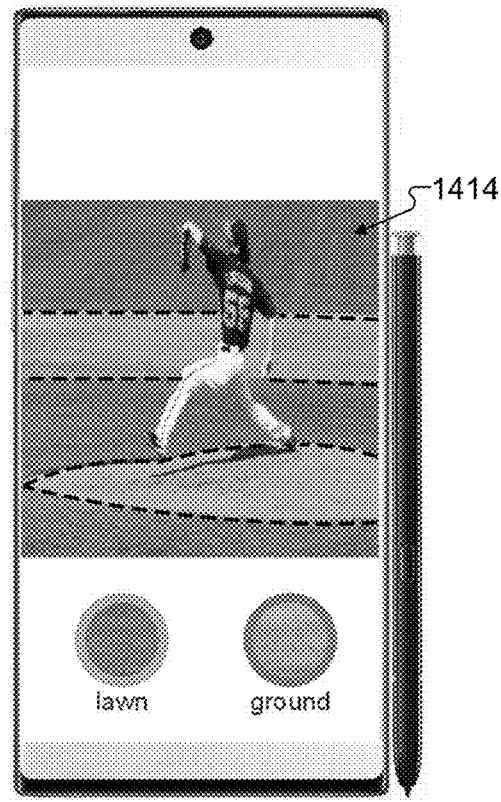
FIG. 14C

SYSTEM AND METHOD FOR PRECISE IMAGE INPAINTING TO REMOVE UNWANTED CONTENT FROM DIGITAL IMAGES

CROSS-REFERENCE TO RELATED APPLICATION AND PRIORITY CLAIM

This application claims priority under 35 U.S.C. § 119(e) to U.S. Provisional Patent Application No. 62/940,147 filed on Nov. 25, 2019, which is hereby incorporated by reference in its entirety.

TECHNICAL FIELD

This disclosure relates generally to imaging systems. More specifically, this disclosure relates to a system and method for precise image inpainting to remove unwanted content from digital images.

BACKGROUND

Mobile electronic devices, such as smartphones and tablet computers, have become the most prevalent device type for capturing, uploading, and sharing digital images. In many instances, users wish to edit their digital images before uploading or sharing. This is often due to difficulty in capturing "perfect" digital images (as judged by the users) at manageable time costs. Unwanted object removal or other unwanted content removal is one type of editing function that users typically wish to perform prior to uploading or sharing digital images. For example, users may wish to remove unwanted people or other unwanted objects from digital images. To perform unwanted content removal, a user may typically identify a region of a digital image in which at least one object is to be removed and replaced. A convolution neural network is then used to fill replacement content into that region, where the replacement content is typically based on other content remaining within the digital image. Unfortunately, convolution neural networks often produce poor results when filling replacement content into regions in which unwanted content is being removed. For instance, convolution neural networks often generate visible artifacts in the edited digital images.

SUMMARY

This disclosure relates to a system and method for precise image inpainting to remove unwanted content from digital images.

In a first embodiment, an inpainting method includes retrieving image information at an electronic device, where the image information identifies an area within an image. The method also includes retrieving, using the electronic device, semantic information including a plurality of semantic classes and a semantic class distribution for each semantic class of the plurality of semantic classes. The method further includes generating semantic codes associated with different portions of the image based on the image information and the semantic information. In addition, the method includes constructing the area within the image by generating image content based on the semantic codes.

In a second embodiment, an apparatus includes at least one processor configured to obtain image information, where the image information identifies an area within an image. The at least one processor is also configured to identify semantic information including a plurality of semantic classes and a semantic class distribution for each semantic class of the plurality of semantic classes. The at least one processor is further configured to generate semantic codes associated with different portions of the image based on the image information and the semantic information. In addition, the at least one processor is configured to construct the area within the image by generating image content based on the semantic codes.

In a third embodiment, a non-transitory computer readable medium contains instructions that when executed cause at least one processor to obtain image information, where the image information identifies an area within an image. The medium also contains instructions that when executed cause the at least one processor to identify semantic information including a plurality of semantic classes and a semantic class distribution for each semantic class of the plurality of semantic classes. The medium further contains instructions that when executed cause the at least one processor to generate semantic codes associated with different portions of the image based on the image information and the semantic information. In addition, the medium contains instructions that when executed cause the at least one processor to construct the area within the image by generating image content based on the semantic codes.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 2A, 2B, and 2C illustrate an example technique for precise image inpainting to remove unwanted content from digital images in accordance with this disclosure;

FIG. 11 illustrates an example process for image decoding in the technique of FIGS. 2A, 2B, and 2C in accordance with this disclosure;

FIGS. 14A, 14B, and 14C illustrate first example results that may be obtained using precise image inpainting in accordance with this disclosure;

DETAILED DESCRIPTION

Figure 1:
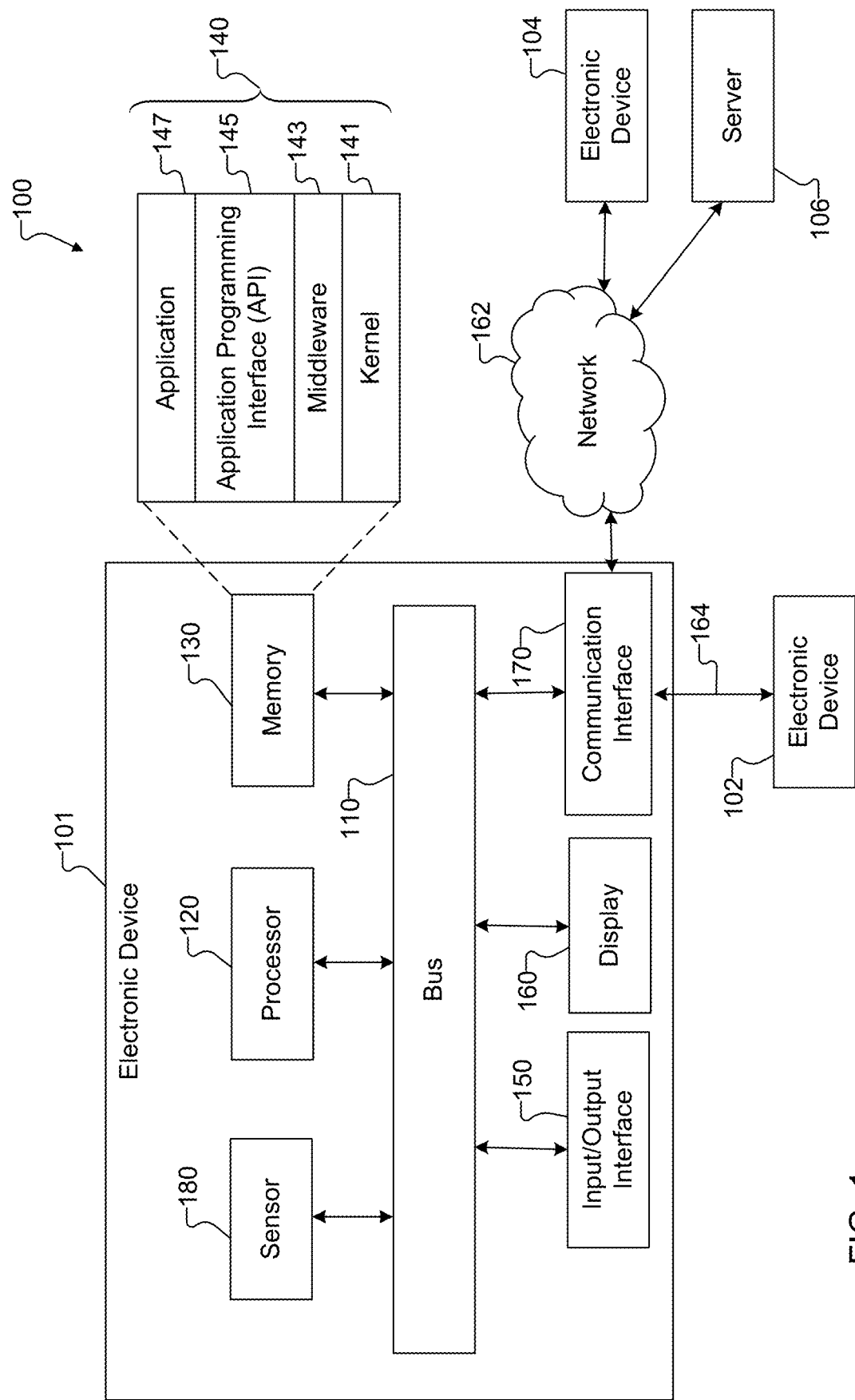
FIG. 1 illustrates an example network configuration including an electronic device in accordance with this disclosure.

FIGS. 1 through 16, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, mobile electronic devices, such as smartphones and tablet computers, have become the most prevalent device type for capturing, uploading, and sharing digital images. In many instances, users wish to edit their digital images before uploading or sharing, and unwanted object removal or other unwanted content removal is one type of editing function that users typically wish to perform prior to uploading or sharing digital images. To perform unwanted content removal, a user may typically identify a region of a digital image in which at least one object is to be removed and replaced. A convolution neural network (CNN) is then used to fill replacement content into that region, where the replacement content is typically based on other content remaining within the digital image.

Unfortunately, convolution neural networks often produce poor results when filling replacement content into regions in which unwanted content is being removed. One reason why a convolution neural network often produces poor results during unwanted content removal is that the convolution neural network typically processes pixels of a digital image within a moving window of fixed size, and it is relatively common for a moving window within a digital image to encompass pixels of different semantic classes. A "semantic class" refers to a specific type or class of image data that might be present in an image, such as image data related to ground, water, sky, grass, or mountains. A digital image of a complicated or mixed scene commonly contains image data of multiple semantic classes. When a moving window includes pixels of multiple semantic classes, a convolution neural network attempts to use all of those pixels as contextual information when generating replacement content for a removed object. Some of the contextual information in the window should be used, but other contextual information (referred to as "disturbing" contextual information) should not be used. However, the convolution neural network may be unable to selectively utilize only the correct semantic class or classes to be used when generating the replacement content for the removed object. As a result, the convolution neural network may generate ambiguity artifacts because the convolution neural network is not able to apply only the specific semantic class(es) that should be used to generate the replacement content for the removed object.

This disclosure provides techniques for precise image inpainting to remove unwanted content from digital images. As described in more detail below, an input image is processed during an unwanted content removal process in order to more precisely replace unwanted content in the input image. More specifically, a semantic encoder generates semantic code vectors for the input image at different scales, where the semantic code vectors identify various semantic classes of content contained in different portions of the input image. The semantic code vectors are generated using the input image, a semantic mask with at least one hole associated with unwanted content being removed, and a filled semantic mask with the at least one hole filled with one or more semantic classes. An initial decoder uses the filled semantic mask and the semantic code vectors to precisely apply the semantic code vectors and generate an initial image feature map associated with the input image. An image decoder uses the semantic code vectors and the initial image feature map to precisely apply the semantic code vectors and reconstruct an output image, where the unwanted content in the input image has been removed and replaced with other content in the output image.

In this way, the disclosed techniques can more effectively determine what semantic class or classes should be used to fill each hole in an input image being processed, determine how the semantic class(es) should be distributed within each hole, and determine what each filled hole should look like. As a result, these techniques support more effective image inpainting, which can produce improved results with fewer or no artifacts and which can reduce user labor and time costs significantly. Among other things, this can be achieved by avoiding the use of convolution operations to extract contextual information and to apply the contextual information while still allowing the extraction and application of the contextual information to be precisely performed using other operations. Note that convolution operations may still be used for other operations during the image inpainting process.

In the following discussion, it is often assumed that one or more objects to be removed in an input image are identified by a user using an electronic pen, stylus, or other input device using a touchscreen of an electronic device. However, any other suitable input mechanism may be used to obtain user input defining one or more objects or other areas to be removed in an input image, including touch input by a user using his or her finger on the touchscreen. Also note that the actual boundary or boundaries of one or more objects or other areas to be removed in an input image may be altered somewhat relative to the actual input from a user, such as when edge detection is used to more accurately isolate at least one object to be removed within the input image so that other portions of the input image remain (even if they were included in an area selected for removal by the user). In general, one or more objects or other areas to be removed in an input image can be identified in any suitable manner, with or without assistance from the electronic device that is performing the unwanted content replacement operations.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process input images to perform precise image inpainting and remove unwanted content from the input images as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input images to perform precise image inpainting and remove unwanted content from the input images. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process input images to perform precise image inpainting and remove unwanted content from the input images as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2A, 2B, and 2C illustrate an example technique for precise image inpainting to remove unwanted content from digital images in accordance with this disclosure. More specifically, FIGS. 2A, 2B, and 2C respectively illustrate three operations 202, 204, and 206 of the example inpainting technique. For ease of explanation, the inpainting technique of FIGS. 2A, 2B, and 2C may be performed by the electronic device 101 of FIG. 1. However, the inpainting technique may be used with any suitable device(s) and in any suitable system(s), such as when the inpainting technique is performed by the server 106 in FIG. 1 or in another system.

As shown in FIG. 2A, a first operation 202 of the inpainting technique involves the use of three inputs, namely an input image 208, a semantic mask 210, and a filled semantic mask 212. The input image 208 represents an image in which one or more portions of the image (in this case a circular area) are being removed. Each portion of the input image 208 being removed is often referred to as a "hole." The input image 208 typically includes image data of multiple semantic classes, which (as described above) often makes it difficult for pure CNN-based architectures to generate replacement content for one or more holes. In this specific example, the input image 208 is shown as having two regions of different semantic classes (a top region and a bottom region), which may be relatively common in scenes such as those with the ground and the sky. The input image 208 also includes a circular region representing a single area or hole in which image content is being removed. Note, however, that this input image 208 is an example only and is merely used to help explain further operations of the inpainting technique.

The semantic mask 210 represents an initial estimation of the semantic classes associated with the input image 208. Here, the semantic mask 210 includes an initial estimation of the semantic class for each of multiple portions of the input image 208, where each portion represents a small square or other collection of pixels from the input image 208. The semantic mask 210 also includes at least one hole corresponding to the one or more holes of the input image 208 where content is being removed. The filled semantic mask 212 represents an initial estimation of the semantic classes associated with the input image 208, including labels for one or more semantic classes estimated for each hole in which content is being removed in the input image 208. Example techniques for generating the semantic mask 210 and the filled semantic mask 212 based on the input image 208 are provided below.

The input image 208, the semantic mask 210, and the filled semantic mask 212 are provided to a semantic encoder 214. The semantic encoder 214 processes these inputs in order to generate multiple collections 216a-216b of semantic code vectors 218 at different scales. Among other things, each semantic code vector 218 identifies a semantic code for a portion of the input image 208. A semantic code represents a latent code for a specific semantic class that is contained in the associated portion of the input image 208. In some cases, the latent code may be similar in function to the input Gaussian noise vector for a generative adversarial network, so a semantic code represents a latent code of a specific semantic class extracted and compressed from a portion of the input image 208. The semantic codes therefore provide contextual information related to the image contents of the input image 208. A semantic code vector 218 represents an alias of a semantic code, since the semantic code is being represented in vector form by the semantic code vector 218.

The different collections 216a-216b of semantic code vectors 218 here represent semantic codes at two different scales of the input image 208. For instance, the collection 216a includes a 2×2 collection of semantic code vectors 218 (meaning each semantic code vector 218 is associated with ¼ of the input image), and the collection 216b includes a 4×4 collection of semantic code vectors 218 (meaning each semantic code vector 218 is associated with ¹⁄₁₆ of the input image). The ellipsis in FIG. 2A indicates that other collections of semantic code vectors 218 may also or alternatively be produced here, such as 3×3, 5×5, 6×6, 7×7, 8×8, and so on. One example technique for implementing the semantic encoder 214 is described below.

As can be seen in this example, the semantic code vectors 218 in each collection 216a-216b correspond to the semantic classes identified in the filled semantic mask 212. For example, the top two semantic code vectors 218 in the collection 216a are associated with one semantic class, and the bottom two semantic code vectors 218 in the collection 216a are associated with another semantic class. Similarly, the top eight semantic code vectors 218 in the collection 216b are associated with one semantic class, and the bottom eight semantic code vectors 218 in the collection 216b are associated with another semantic class. This is consistent with the semantic classes contained in the actual input image 208, and it indicates that semantic classes for each hole representing content being removed in the input image 208 can be identified by the semantic encoder 214 using the approach described below. Overall, the semantic encoder 214 here operates to precisely extract semantic codes associated with the input image 208 and with one or more holes representing content being removed in the input image 208.

As shown in FIG. 2B, a second operation 204 of the inpainting technique uses at least one of the collections 216a-216b of semantic code vectors 218 and the filled semantic mask 212, which are provided to an initial decoder 220. The initial decoder 220 processes these inputs in order to generate an initial image feature map 222, which represents the high-level features of the input image 208 in terms of semantic content. A feature map represents an intermediate result within a neural network, where the intermediate result is represented as a 3D-tensor (there is a latent vector at each location on an image plane). The filled semantic mask 212 is used here to directly guide the initial decoder 220 in order to generate the initial image feature map 222. For instance, the filled semantic mask 212 can be used to "zero out" or mask locations of the input image 208 that do not belong to a specific semantic class during the generation of the initial image feature map 222. In some cases, the initial decoder 220 uses the collection 216a of semantic code vectors 218 to generate the initial image feature map 222 since the collection 216a of semantic code vectors 218 has the lowest scale (resolution). However, the ellipsis in FIG. 2B indicates that another collection or collections of semantic code vectors 218 may be used by the initial decoder 220. One example technique for implementing the initial decoder 220 is described below.

As can be seen in this example, the initial image feature map 222 is divided in half, which indicates that different features in each half of the initial image feature map 222 are associated with two different semantic classes. Again, this is consistent with the semantic classes contained in the input image 208. This also indicates that the initial image feature map 222 can include, for each hole representing content being removed in the input image 208, features for replacement content to be generated for that hole. The initial image feature map 222 can have any suitable resolution, such as 32×32 (although other resolutions may be used). Overall, the initial decoder 220 here operates to precisely apply the extracted semantic codes to generate the initial image feature map 222.

As shown in FIG. 2C, a third operation 206 of the inpainting technique uses at least some of the collections 216a-216b of semantic code vectors 218 and the initial image feature map 222, which are provided to an image decoder 224. The image decoder 224 processes these inputs in order to generate a final output image 226, which represents the input image 208 as modified by replacing content in one or more holes with replacement content. The ellipsis in FIG. 2C indicates that the collections 216a-216b of semantic code vectors 218 at different scales can be provided to and used by the image decoder 224 when generating the final output image 226. For example, the use of semantic code vectors 218 at different scales allows the image decoder 224 to generate image features at the corresponding scales in the final output image 226. One example technique for implementing the image decoder 224 is described below.

As can be seen in this example, the final output image 226 is divided in half, which indicates that the final output image 226 contains image data associated with two different semantic classes. Once again, this is consistent with the semantic classes contained in the input image 208. This also indicates that the final output image 226 correctly contains replacement content of two different semantic classes in the circular hole, where the replacement content has been automatically generated and used to fill the original hole of the input image 208. Overall, the image decoder 224 here operates to precisely apply the extracted semantic codes in order to reconstruct image data in the final output image 226.

Note that the operations and functions described above with reference to FIGS. 2A, 2B, and 2C can be implemented in an electronic device 101, 102, 104, server 106, or other device in any suitable manner. For example, in some embodiments, the operations and functions described above can be implemented or supported using one or more software applications or other software instructions that are executed by at least one processor 120 of a device. In other embodiments, at least some of the operations and functions described above can be implemented or supported using dedicated hardware components. In general, the operations and functions described above can be performed using any suitable hardware or any suitable combination of hardware and software/firmware instructions.

Although FIGS. 2A, 2B, and 2C illustrate one example of a technique for precise image inpainting to remove unwanted content from digital images, various changes may be made to FIGS. 2A, 2B, and 2C. For example, collections of semantic code vectors 218 having any suitable scales may be used here. Also, input images 208 containing image data of any number of semantic classes may be received and processed. In addition, any suitable hole or holes of regular or irregular shape(s) may be defined in order to identify one or more objects or other portions of an image to be removed with replacement content.

Figure 3:
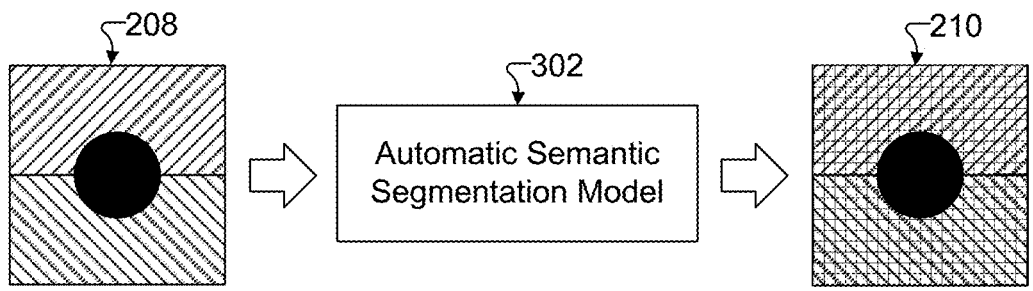
FIG. 3 illustrates an example process for generating a semantic mask with one or more holes for use in the technique of FIGS. 2A, 2B, and 2C in accordance with this disclosure.

FIG. 3 illustrates an example process for generating a semantic mask 210 with one or more holes for use in the technique of FIGS. 2A, 2B, and 2C in accordance with this disclosure. For ease of explanation, the process of FIG. 3 may be performed by the electronic device 101 of FIG. 1. However, this process may be used with any suitable device(s) and in any suitable system(s), such as when the process is performed by the server 106 in FIG. 1 or in another system.

As shown in FIG. 3, the input image 208 is processed using an automatic semantic segmentation model 302. The automatic semantic segmentation model 302 may represent a trained machine learning model or other model that has been trained or otherwise configured to recognize different classes of semantic content in images. For example, the automatic semantic segmentation model 302 can process the input image 208 and identify an initial estimation of the semantic class for each of multiple portions of the input image 208. Each portion of the input image 208 may represent a small square or other collection of pixels in the input image 208. Again, the semantic mask 210 includes at least one hole corresponding to the one or more holes of the input image 208 in which content in the input image 208 is being removed. The automatic semantic segmentation model 302 may use any suitable technique to identify initial estimations of the semantic classes in the input image 208. Various techniques are known in the art for identifying semantic classes of image data in images, and more techniques are sure to be developed in the future. As a particular example, one or more of the Deeplab segmentation algorithms available on the TensorFlow platform from GOOGLE may be used here.

Although FIG. 3 illustrates one example of a process for generating a semantic mask 210 with one or more holes for use in the technique of FIGS. 2A, 2B, and 2C, various changes may be made to FIG. 3. For example, the use of a machine learning model is one example way in which semantic classes of image data in images can be identified. However, semantic classes may be identified in any other suitable manner.

Figure 4A:
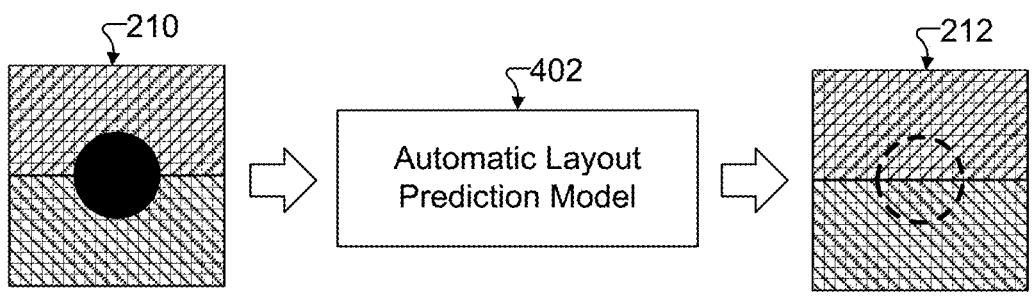
FIGS. 4A and 4B illustrate example processes for generating a filled semantic mask for use in the technique of FIGS. 2A, 2B, and 2C in accordance with this disclosure.
Figure 4B:
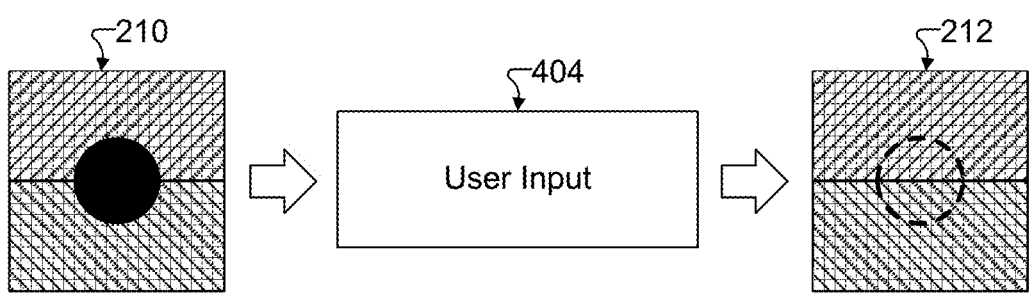

FIGS. 4A and 4B illustrate example processes for generating a filled semantic mask 212 for use in the technique of FIGS. 2A, 2B, and 2C in accordance with this disclosure. For ease of explanation, the processes of FIGS. 4A and 4B may be performed by the electronic device 101 of FIG. 1. However, these processes may be used with any suitable device(s) and in any suitable system(s), such as when the processes are performed by the server 106 in FIG. 1 or in another system.

As shown in FIG. 4A, the semantic mask 210 may be processed using an automatic layout prediction model 402. The automatic layout prediction model 402 may represent a trained machine learning model or other model that has been trained or otherwise configured to estimate the layout of different classes of semantic content in images, which allows one or more boundaries between two or more semantic classes to be identified. For example, the automatic layout prediction model 402 can process the semantic mask 210 and identify the likely boundary between the two semantic classes contained in the semantic mask 210. This allows the automatic layout prediction model 402 to estimate the semantic class or semantic classes that should be used within the hole(s) contained in the semantic mask 210, as well as the distribution of the semantic class or semantic classes within the hole(s). As a result, the hole(s) may be filled with the correct semantic class(es) in the appropriate locations based on the identified boundary or boundaries to produce the filled semantic mask 212. The automatic layout prediction model 402 may use any suitable technique to identify a layout of or boundary between different semantic classes in the semantic mask 210. Various techniques are known in the art for estimating layouts or boundaries of semantic classes of image data in images, and more techniques are sure to be developed in the future. As a particular example, the technique disclosed in Berlincioni et al., "Road layout understanding by generative adversarial inpainting," Inpainting and Denoising Challenges, 2019, pages 111-128 (which is hereby incorporated by reference in its entirety) may be used here.

As shown in FIG. 4B, the semantic mask 210 may alternatively be processed based on user input 404 in order to identify the layout of different classes of semantic content in the semantic mask 210. For example, a user may draw one or more boundaries or separation lines between adjacent portions of an image (such as the input image 208 or the semantic mask 210) in order to identify one or more desired boundaries between two or more semantic classes. The user input may be provided by a user using his or her finger, an electronic pen, a stylus, or other input device with a touchscreen. Some pre-processing of the user input 404 may also occur prior to use in defining the boundary or boundaries between semantic classes, such as smoothing of the user input 404 or adjusting of the user input 404 to match or follow one or more edges in the input image 208. Again, this allows a device to identify the semantic class or semantic classes that should be used within the hole(s) contained in the semantic mask 210, as well as the distribution of the semantic class or semantic classes within the hole(s). As a result, the hole(s) may be filled with the correct semantic class(es) in the appropriate locations based on the identified boundary or boundaries to produce the filled semantic mask 212.

Although FIGS. 4A and 4B illustrate examples of processes for generating a filled semantic mask 212 for use in the technique of FIGS. 2A, 2B, and 2C, various changes may be made to FIGS. 4A and 4B. For example, the use of a machine learning model or user input are two example ways in which boundaries between and distributions of semantic classes in images can be identified. However, boundaries between semantic classes may be identified in any other suitable manner.

Figure 5:
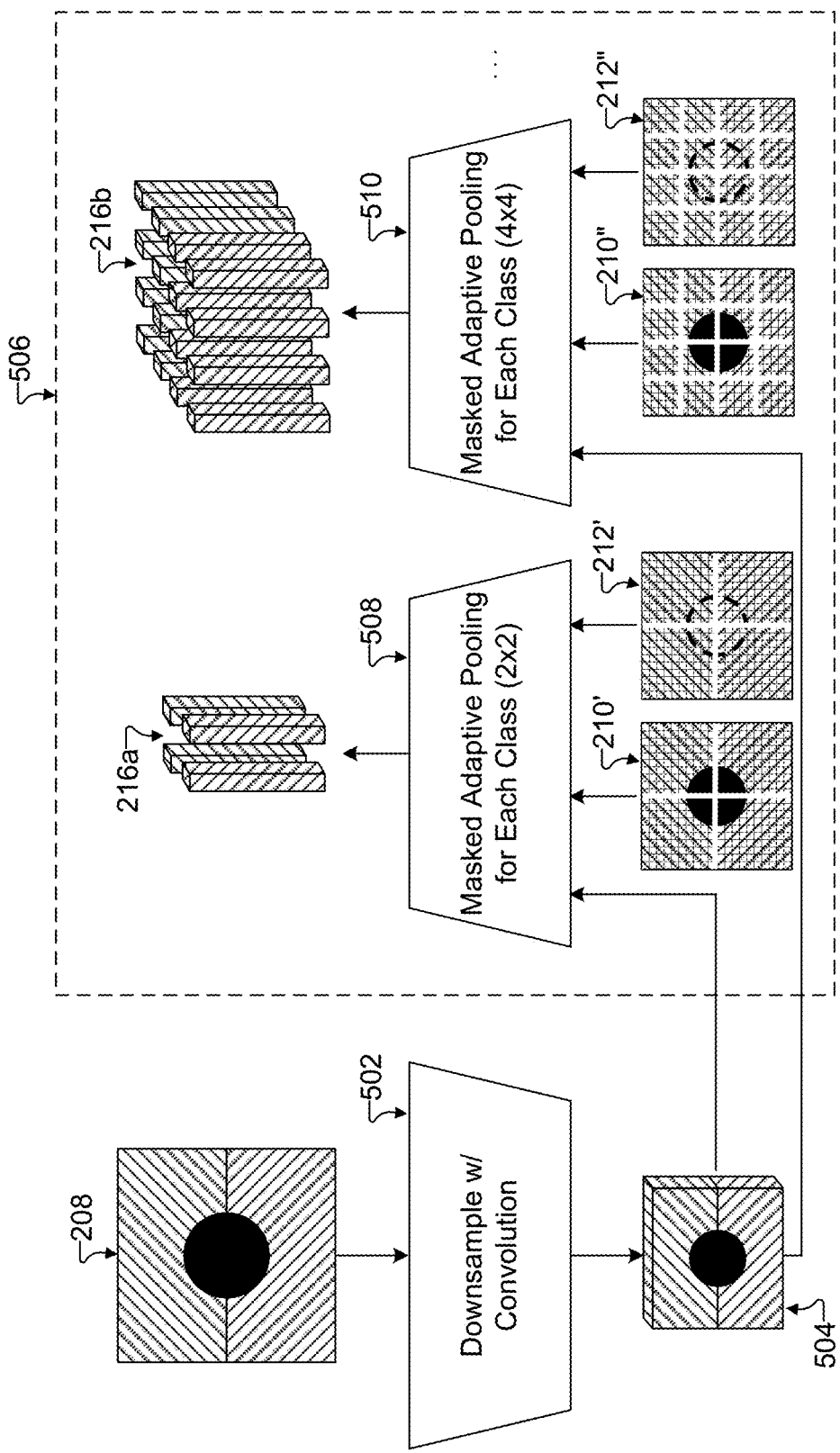
FIG. 5 illustrates an example process for semantic encoding in the technique of FIGS. 2A, 2B, and 2C in accordance with this disclosure.

FIG. 5 illustrates an example process for semantic encoding in the technique of FIGS. 2A, 2B, and 2C in accordance with this disclosure. More specifically, FIG. 5 illustrates an example process that can be performed using the semantic encoder 214 of FIG. 2A. For ease of explanation, the process of FIG. 5 may be performed by the electronic device 101 of FIG. 1. However, this process may be used with any suitable device(s) and in any suitable system(s), such as when the process is performed by the server 106 in FIG. 1 or in another system.

As shown in FIG. 5, the input image 208 is provided to a downsampling and convolution operation 502. The downsampling and convolution operation 502 downsamples the input image 208 by reducing the resolution of the input image 208. The downsampled input image 208 passes through one or more convolutional layers, where each convolutional layer applies a convolution function to its inputs in order to generate its outputs. A convolutional layer generally represents a layer of convolutional neurons, which apply a convolution function that emulates the response of individual neurons to visual stimuli. Each neuron typically applies some function to its input values (often by weighting different input values differently) to generate output values. A convolutional layer may be associated with an activation function, which can apply a specific function or operation to the output values from the neurons to produce final outputs of the convolutional layer. A number of convolutional layers may be used here, where the first convolutional layer receives and processes the downsampled input image 208 and each remaining convolutional layer receives and processes the outputs from the prior convolutional layer. The output of each convolutional layer has a lower resolution than its input. The output of the downsampling and convolution operation 502 is a downsampled feature map 504, which represents the high-level features of the downsampled version of the input image 208.

A contextual information extraction operation 506 uses the downsampled feature map 504 and different versions of the semantic mask 210 and the filled semantic mask 212 to generate the collections 216a-216b of semantic code vectors 218. The contextual information extraction operation 506 occurs here without using convolution operations, which helps to avoid problems of a moving window overlapping multiple semantic classes and the resulting ambiguity artifacts.

The collection 216a of semantic code vectors 218 is generated by a masked adaptive pooling operation 508, which operates at a first scale. Here, the masked adaptive pooling operation 508 receives the downsampled feature map 504, a segmented semantic mask 210', and a segmented filled semantic mask 212'. The segmented semantic mask 210' and the segmented filled semantic mask 212' represent the semantic mask 210 and the filled semantic mask 212 that are divided or "chunked" based on the scale used by the masked adaptive pooling operation 508 (2×2 in this case). The masked adaptive pooling operation 508 processes these inputs in order to pool semantic codes according to the segmented semantic mask 210' and to adaptively fill semantic codes into one or more holes using nearby contextual codes of the same semantic class according to the segmented filled semantic mask 212'.

Similarly, the collection 216b of semantic code vectors 218 is generated by a masked adaptive pooling operation 510, which operates at a second scale different from the first scale. Here, the masked adaptive pooling operation 510 receives the downsampled feature map 504, another segmented semantic mask 210", and another segmented filled semantic mask 212". The segmented semantic mask 210" and the segmented filled semantic mask 212" represent the semantic mask 210 and the filled semantic mask 212 that are divided or chunked based on the scale used by the masked adaptive pooling operation 510 (4×4 in this case). The masked adaptive pooling operation 510 processes these inputs in order to pool semantic codes according to the segmented semantic mask 210" and to adaptively fill semantic codes into one or more holes using nearby contextual codes of the same semantic class according to the segmented filled semantic mask 212".

One example approach for performing the pooling and adaptive filling by the masked adaptive pooling operations 508 and 510 is provided below. Note that the ellipsis in FIG. 5 indications that other collections of semantic code vectors 218 may be generated at other scales using the same type of approach shown here. The end result here is that the collections 216a-216b of semantic code vectors 218 (plus other collections at other scales if needed or desired) can be generated without relying on convolution operations. Instead, the masked adaptive pooling operations 508 and 510 can be used to extract precise contextual information of the input image 208, which avoids ambiguity artifacts typically created using convolution operations.

Although FIG. 5 illustrates one example of a process for semantic encoding in the technique of FIGS. 2A, 2B, and 2C, various changes may be made to FIG. 5. For example, collections of semantic code vectors 218 having any suitable scales may be generated here. Also, input images 208 containing image data of any number of semantic classes may be received and processed. In addition, any suitable hole or holes of regular or irregular shape(s) may be defined in order to identify one or more portions of an image to be removed and replaced with replacement content.

Figure 6:
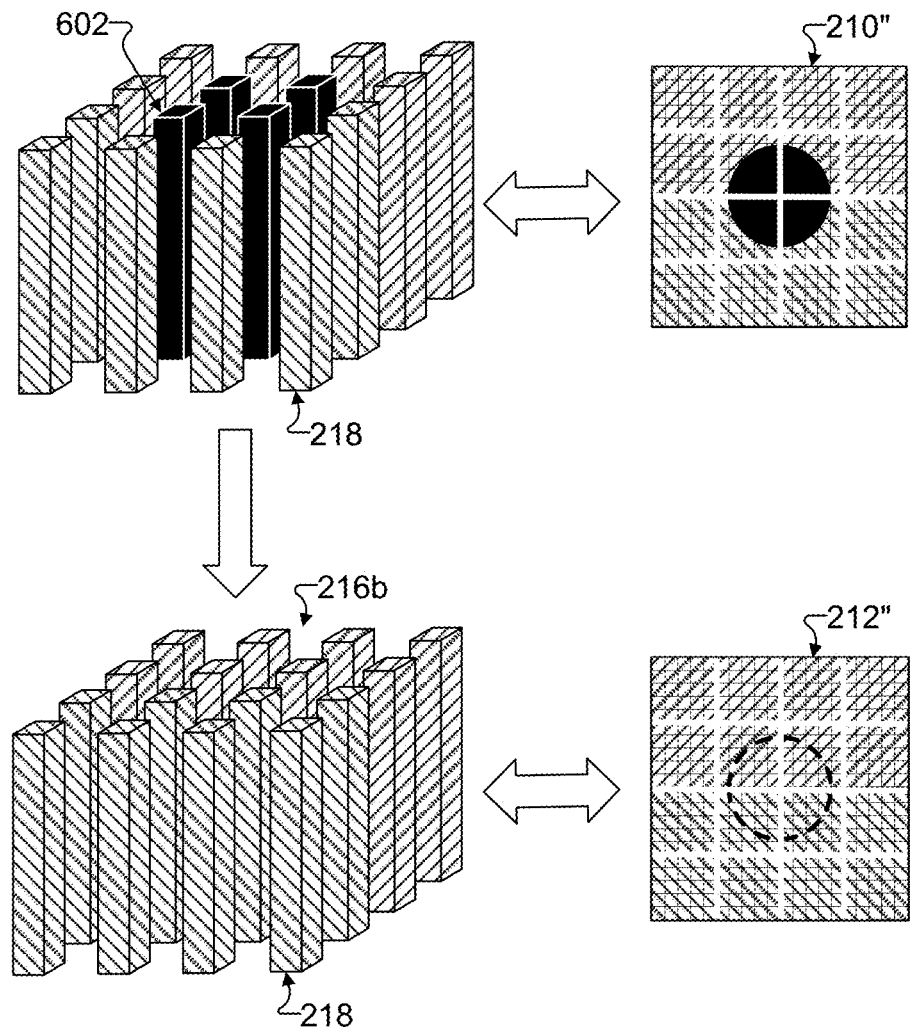
FIG. 6 illustrates an example filling of semantic content during semantic encoding in FIG. 5 in accordance with this disclosure.

FIG. 6 illustrates an example filling of semantic content during semantic encoding in FIG. 5 in accordance with this disclosure. More specifically, FIG. 6 illustrates one example of how the collection 216b of semantic code vectors 218 may be generated by the masked adaptive pooling operation 510 even with the presence of a hole in the input image 208. The same or similar process may occur with the masked adaptive pooling operation 508 or other masked adaptive pooling operations that produce other collections of semantic code vectors 218. For ease of explanation, the filling of semantic content in FIG. 6 may be performed by the electronic device 101 of FIG. 1. However, this may be done with any suitable device(s) and in any suitable system(s), such as when this is performed by the server 106 in FIG. 1 or in another system.

As shown in FIG. 6, various valid semantic code vectors 218 associated with portions or chunks of the input image 208 and the segmented semantic mask 210" containing no portion of the hole can be generated. These valid semantic code vectors 218 can identify semantic codes that properly identify the semantic classes of the image data in the input image 208. However, various unfilled or invalid semantic code vectors 602 are associated with portions or chunks of the input image 208 and the segmented semantic mask 210" that contain portions of the hole. These invalid semantic code vectors 602 are "contaminated" due to the presence of the hole in the input image 208 and the segmented semantic mask 210".

To help compensate for this, the masked adaptive pooling operation 510 can pool values from neighboring valid semantic code vectors 218 in order to generate valid semantic code vectors to replace the invalid semantic code vectors 602. Moreover, this is accomplished by the masked adaptive pooling operation 510 hiding or "masking" neighboring valid semantic code vectors 218 that are not associated with the same semantic class identified for each invalid semantic code vectors 602. As a result, the masked adaptive pooling operation 510 can both (i) use masking to prevent neighboring valid semantic code vectors 218 of different semantic classes from being used to generate a new valid semantic code vector 218 and (ii) account for variations in different input images adaptively. The result is that the invalid semantic code vectors 602 can be replaced with valid semantic code vectors 218 of the correct semantic class(es), which enables a more accurate generation of replacement content for the hole in the input image 208.

Figure 7A:
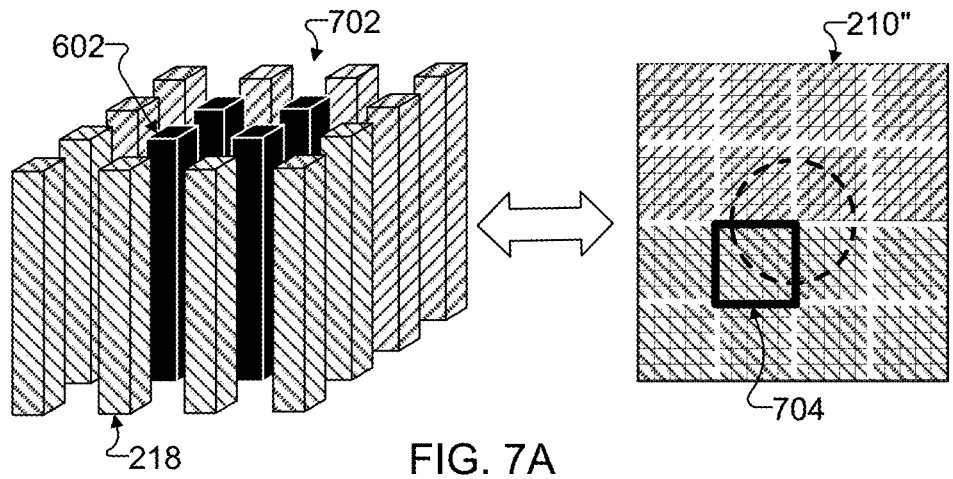
FIGS. 7A, 7B, and 7C illustrate an example process for filling semantic content during semantic encoding in FIG. 5 in accordance with this disclosure.
Figure 7B:
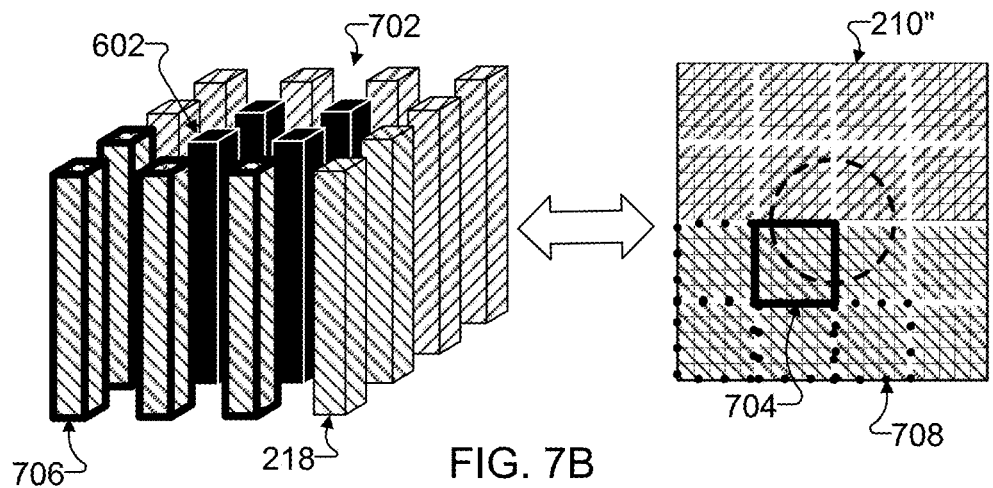
Figure 7C:
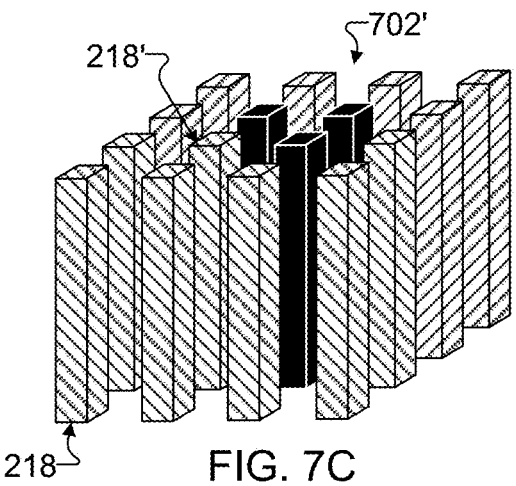

FIGS. 7A, 7B, and 7C illustrate an example process for filling semantic content during semantic encoding in FIG. 5 in accordance with this disclosure. More specifically, FIGS. 7A, 7B, and 7C illustrate an example process for replacing invalid semantic code vectors 602 with valid semantic code vectors 218. For ease of explanation, the filling of semantic content in FIGS. 7A, 7B, and 7C may be performed by the electronic device 101 of FIG. 1. However, this may be done with any suitable device(s) and in any suitable system(s), such as when this is performed by the server 106 in FIG. 1 or in another system.

As shown in FIG. 7A, an initial collection 702 of semantic code vectors includes various valid semantic code vectors 218 and several invalid semantic code vectors 602. One of the invalid semantic code vectors 602 is selected, such as the bottom left invalid semantic code vector 602 (the order of selection may be fixed or variable as needed or desired). A chunk 704 associated with the selected invalid semantic code vector 602 in the segmented semantic mask 210″ is examined in order to identify the semantic class to be used with the selected invalid semantic code vectors 602. In this case, the chunk 704 associated with the selected invalid semantic code vector 602 indicates that the selected invalid semantic code vector 602 should have the semantic class associated with the lower half of the input image 208.

As shown in FIG. 7B, the masked adaptive pooling operation 510 searches for valid semantic code vectors 218 that are (i) relatively near the selected invalid semantic code vector 602 and (ii) associated with the same semantic class as the selected invalid semantic code vector 602. In this example, the masked adaptive pooling operation 510 identifies four valid semantic code vectors 218 satisfying these criteria. These valid semantic code vectors 218 are associated with four chunks 708 in the segmented semantic mask 210″. These four valid semantic code vectors 218 are near the selected invalid semantic code vector 602, and all of these valid semantic code vectors 218 have the same semantic class as the selected invalid semantic code vector 602. Other semantic code vectors near the selected invalid semantic code vector 602 are either invalid or belong to a different semantic class.

Note that, in some embodiments, the masked adaptive pooling operation 510 first searches in the immediate neighborhood around the selected invalid semantic code vector 602. This means that the masked adaptive pooling operation 510 examines all semantic code vectors that are one hop away from the selected invalid semantic code vector 602 (horizontally, vertically, and diagonally). If the masked adaptive pooling operation 510 cannot identify at least one valid semantic code vector 218 of the same semantic class as the selected invalid semantic code vector 602 (and if the size of the collection 702 allows it), the masked adaptive pooling operation 510 can expand the search further around the selected invalid semantic code vector 602. For instance, the masked adaptive pooling operation 510 may examine all semantic code vectors that are two hops away from the selected invalid semantic code vector 602 (horizontally, vertically, and diagonally). If the masked adaptive pooling operation 510 cannot identify at least one valid semantic code vector 218 of the same semantic class as the selected invalid semantic code vector 602 (and if the size of the collection 702 allows it), the masked adaptive pooling operation 510 can again expand the search further around the selected invalid semantic code vector 602. For example, the masked adaptive pooling operation 510 may examine all semantic code vectors that are three hops away from the selected invalid semantic code vector 602 (horizontally, vertically, and diagonally). This can continue until the masked adaptive pooling operation 510 identifies at least one valid semantic code vector 218 of the same semantic class as the selected invalid semantic code vector 602. Ideally, the use of an expanding window here allows the masked adaptive pooling operation 510 to identify one or more valid semantic code vectors 218 that are relatively close to the selected invalid semantic code vector 602 (since valid semantic code vectors 218 farther away from the selected invalid semantic code vector 602 may be less relevant).

As shown in FIG. 7C, the selected valid semantic code vectors 218 are pooled in order to produce a new valid semantic code vector 218' in place of the selected invalid semantic code vector 602. This results in the creation of an updated collection 702' of semantic code vectors. In this example, the new valid semantic code vector 218' represents a combination of the four selected valid semantic code vectors 218 that were relatively close to the selected invalid semantic code vector 602. The new valid semantic code vector 218' is also associated with the same semantic class as the selected invalid semantic code vector 602.

The same process may be repeated here for each of the other remaining invalid semantic code vectors 602. Note that when each of the other invalid semantic code vectors 602 is being replaced with a new valid semantic code vector 218', the masked adaptive pooling operation 510 may or may not consider neighboring valid semantic code vectors 218' for pooling (meaning the masked adaptive pooling operation 510 may or may not only use the original valid semantic code vectors 218 during pooling).

At the end of this process, all of the invalid semantic code vectors 602 have ideally been replaced with valid semantic code vectors 218'. As can be seen here, each invalid semantic code vector 602 is replaced using pooling of only those nearby valid semantic code vectors 218 having the same semantic class as the invalid semantic code vector 602, which reduces or eliminates the problem of ambiguity artifacts. Also, the use of multiple collections 216a-216b of semantic code vectors 218 at different scales helps to provide improved image processing. This is because semantic codes at lower scales preserve layout information better, while semantic codes at higher scales preserve local texture information better. As described below, the semantic codes at lower scales can be applied onto feature maps of lower resolution(s), and the semantic codes at higher scales can be applied onto feature maps of higher resolution(s). Nearby semantic codes of the same class are similar to each other, so the nearby contextual semantic codes can be used to fill semantic codes of hole regions.

Figure 8:
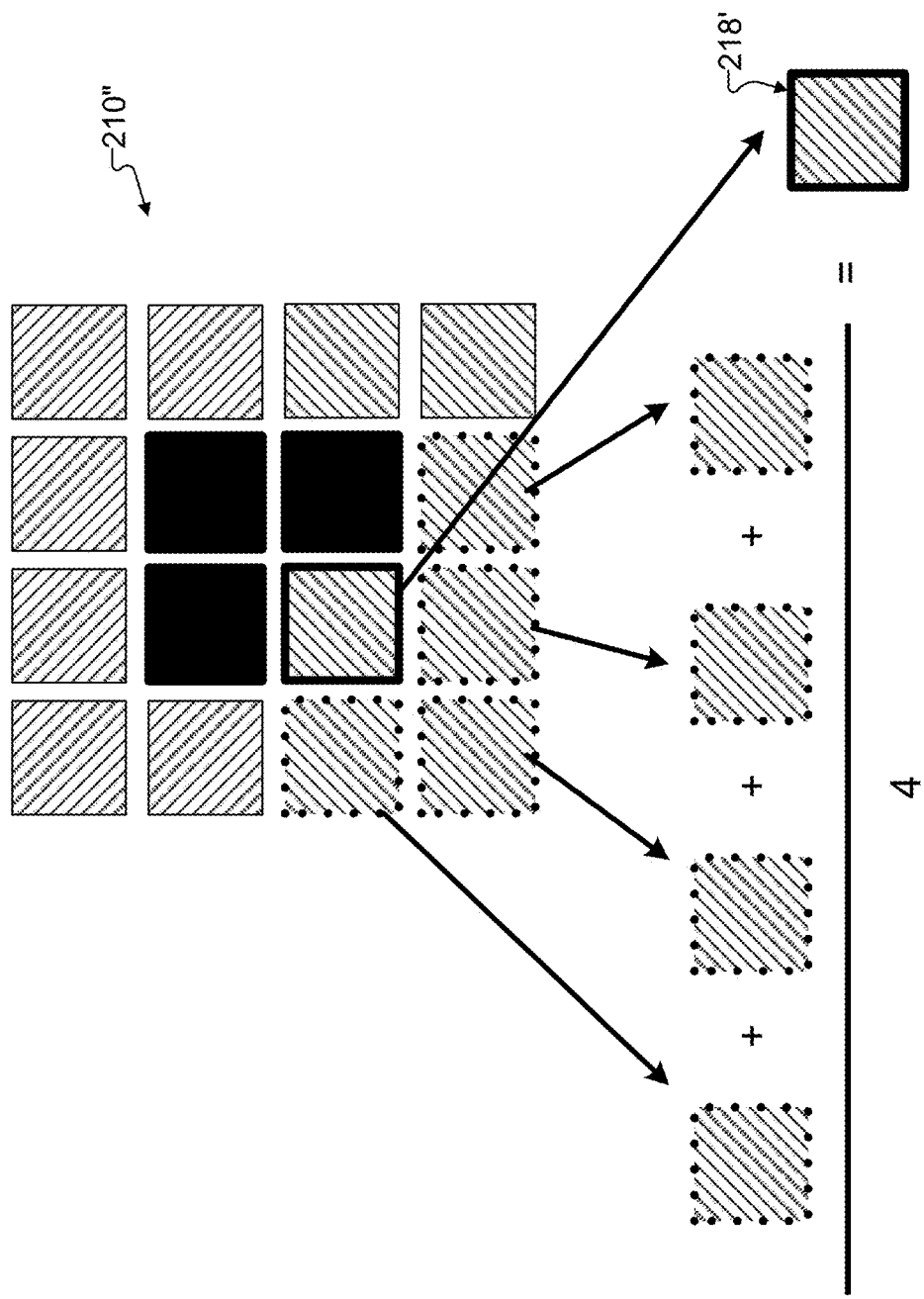
FIG. 8 illustrates an example pooling for filling semantic content during semantic encoding in FIG. 5 in accordance with this disclosure.

FIG. 8 illustrates an example pooling for filling semantic content during semantic encoding in FIG. 5 in accordance with this disclosure. More specifically, FIG. 8 illustrates how selected valid semantic code vectors 218 may be combined to produce a new valid semantic code vector 218' to replace an invalid semantic code vector 602. For ease of explanation, the pooling in FIG. 8 may be performed by the electronic device 101 of FIG. 1. However, this may be done with any suitable device(s) and in any suitable system(s), such as when this is performed by the server 106 in FIG. 1 or in another system.

As shown in FIG. 8, the selected valid semantic code vectors 218 may be summed, and the resulting sum can be divided by the number of selected valid semantic code vectors 218 to generate the new valid semantic code vector 218'. This approach therefore uses average pooling to combine the selected valid semantic code vectors 218 and produce the new valid semantic code vector 218'. Note, however, that any other suitable form of pooling or other combination may be used here to generate a new valid semantic code vector 218' from multiple selected valid semantic code vectors 218.

Although FIG. 6 illustrates one example of the filling of semantic content during semantic encoding in FIG. 5, FIGS. 7A, 7B, and 7C illustrate one example of a process for filling semantic content during semantic encoding in FIG. 5, and FIG. 8 illustrates one example of pooling for filling semantic content during semantic encoding in FIG. 5, various changes may be made to FIGS. 6, 7A, 7B, 7C, and 8. For example, the filling and pooling shown here relate to the specific contents of the input image 208 and the hole in the input image 208. Thus, the filling and pooling can vary based on the actual input image being processed and the actual hole or holes in which content is being removed in the input image. Also, while certain scales for the collections 216a-216b of semantic code vectors 218 are used here, other scales for collections of semantic code vectors 218 may be used.

Figure 9:
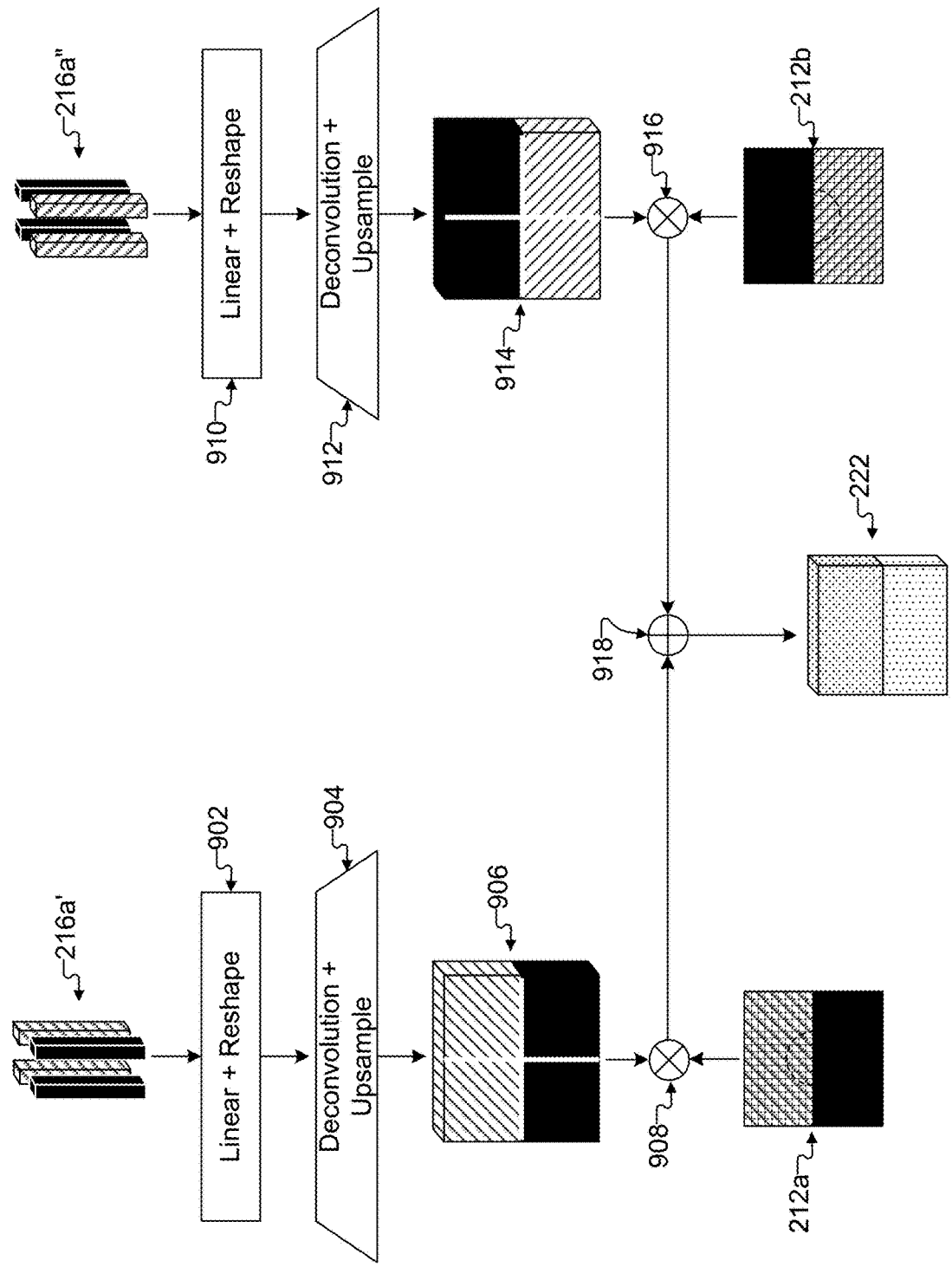
FIG. 9 illustrates an example process for initial decoding in the technique of FIGS. 2A, 2B, and 2C in accordance with this disclosure.

FIG. 9 illustrates an example process for initial decoding in the technique of FIGS. 2A, 2B, and 2C in accordance with this disclosure. More specifically, FIG. 9 illustrates an example process that can be performed using the initial decoder 220 of FIG. 2B. For ease of explanation, the process of FIG. 9 may be performed by the electronic device 101 of FIG. 1. However, this process may be used with any suitable device(s) and in any suitable system(s), such as when the process is performed by the server 106 in FIG. 1 or in another system.

The collections 216a-216b of semantic code vectors 218 (possibly plus one or more other collections of semantic code vectors 218 at one or more other scales) may accurately identify the semantic classes to be used, but the semantic code vectors 218 contain discrete values. The initial decoder 220 helps to transform these discrete values into a continuous domain for use in actually generating replacement content for the hole(s) in the input image 208. As shown in FIG. 9, a first masked collection 216a' of semantic code vectors is provided to a linear transformation and reshaping operation 902. The first masked collection 216a' of semantic code vectors here represents the collection 216a, but only semantic code vectors of one semantic class have non-zero values (the other semantic code vectors of other semantic classes are masked or zeroed out). The linear transformation portion of the linear transformation and reshaping operation 902 operates to flatten the semantic code vectors associated with multiple chunks (if present) and processes the chunks in a batch mode. The chunks can be generated by dividing the image plane evenly to multiple portions, such as to form 2×2 chunks or 4×4 chunks. Thus, the linear transformation portion of the linear transformation and reshaping operation 902 can handle an arbitrary number of chunks. The reshaping portion of the linear transformation and reshaping operation 902 operates to reshape the output of the linear transformation portion back to the same image-like shape regardless of the number of chunks.

The output of the linear transformation and reshaping operation 902 is provided to a deconvolution and upsampling operation 904. The deconvolution and upsampling operation 904 includes one or more deconvolutional layers, where each deconvolutional layer applies a deconvolution function to its inputs in order to generate its outputs. A number of deconvolutional layers may be used here, where the first deconvolutional layer receives the output of the linear transformation and reshaping operation 902 and each remaining deconvolutional layer receives and processes the outputs from the prior deconvolutional layer. Upsampling is also performed here to increase the resolution of the image data. The output of the deconvolution and upsampling operation 904 is a raw initial image feature map 906 for a single semantic class contained in the input image 208. As can be seen here, the two semantic code vectors in the masked collection 216a' that were masked cause the raw initial image feature map 906 to lack any image details in part of the raw initial image feature map 906.

A multiplier operation 908 multiplies or scales the contents of the raw initial image feature map 906 by a first masked version 212a of the filled semantic mask 212. The first masked version 212a of the filled semantic mask 212 here includes non-zero data for only a single semantic class, which is the same semantic class associated with the two semantic code vectors in the masked collection 216a' that were non masked.

A second masked collection 216a" of semantic code vectors is provided to a linear transformation and reshaping operation 910. The second masked collection 216a" of semantic code vectors here represents the collection 216a, but only semantic code vectors of another semantic class have non-zero values. The linear transformation portion of the linear transformation and reshaping operation 910 again operates to flatten the semantic code vectors associated with multiple chunks (if present) and processes the chunks in a batch mode, so the linear transformation portion of the linear transformation and reshaping operation 902 can handle an arbitrary number of chunks. The reshaping portion of the linear transformation and reshaping operation 910 operates to reshape the output of the linear transformation portion back to the same image-like shape regardless of the number of chunks. Note that while two linear transformation and reshaping operations 902 and 910 are shown here, the same linear transformation and reshaping operation may be performed sequentially using the masked collections 216a' and 216a" of semantic code vectors.

The output of the linear transformation and reshaping operation 910 is provided to a deconvolution and upsampling operation 912. The deconvolution and upsampling operation 912 includes one or more deconvolutional layers. A number of deconvolutional layers may be used here, where the first deconvolutional layer receives the output of the linear transformation and reshaping operation 910 and each remaining deconvolutional layer receives and processes the outputs from the prior deconvolutional layer. Upsampling is also performed here to increase the resolution of the image data. The output of the deconvolution and upsampling operation 912 is a raw initial image feature map 914 for a single semantic class contained in the input image 208 (but a different semantic class relative to the raw initial image feature map 906). Again, the two semantic code vectors in the masked collection 216a" that were masked cause the raw initial image feature map 914 to lack any image details in part of the raw initial image feature map 914. Note that while two deconvolution and upsampling operation 904 and 912 are shown here, the same deconvolution and upsampling operation may be performed sequentially using the outputs of the linear transformation and reshaping operation(s) 902 and 910.

A multiplier operation 916 multiplies or scales the contents of the raw initial image feature map 914 by a second masked version 212b of the filled semantic mask 212. The second masked version 212b of the filled semantic mask 212 here includes non-zero data for only a single semantic class (but a different semantic class relative to the first masked version 212a), which is the same semantic class associated with the two semantic code vectors in the masked collection 216a" that were non masked. Note that while two multiplier operations 908 and 916 are shown here, the same multiplier operation may be used sequentially.

The results generated by the multiplier operation 908 represent an initial feature map for one semantic class of the input image 208, and the results generated by the multiplier operation 916 represent an initial feature map for another semantic class of the input image 208. An aggregation operation 918 combines the outputs of the multiplier operations 908 and 916 to generate the initial image feature map 222 for all semantic classes of the input image 208. In this way, the various linear transformation and deconvolution operations are used to precisely apply contextual information of different semantic classes separately in order to produce the initial image feature map 222, which helps to reduce or avoid the effects of mixing disturbing contextual information and the generation of ambiguity artifacts as described above. In other words, the results for different semantic classes can be aggregated, where the results for each semantic class are treated as a portion of the initial image feature map 222.

Although FIG. 9 illustrates one example of a process for initial decoding in the technique of FIGS. 2A, 2B, and 2C, various changes may be made to FIG. 9. For example, while the lowest-resolution collection 216a of semantic code vectors 218 is used here, other collections of semantic code vectors 218 might be used by the initial decoder 220. The specific collection of semantic code vectors 218 used by the initial decoder 220 may be based on any suitable criteria, such as the size of the area being removed in an input image 208 (like where smaller sizes may use more semantic code vectors 218 and larger sizes may be use fewer semantic code vectors 218). Also, this example assumes that there are only two semantic classes contained in the input image 208. When the input image 208 contains more than two semantic classes, the additional semantic classes may be processed using the same approach shown here, where the aggregation operation 918 combines the results for all semantic classes to generate the initial image feature map 222.

Figure 10A:
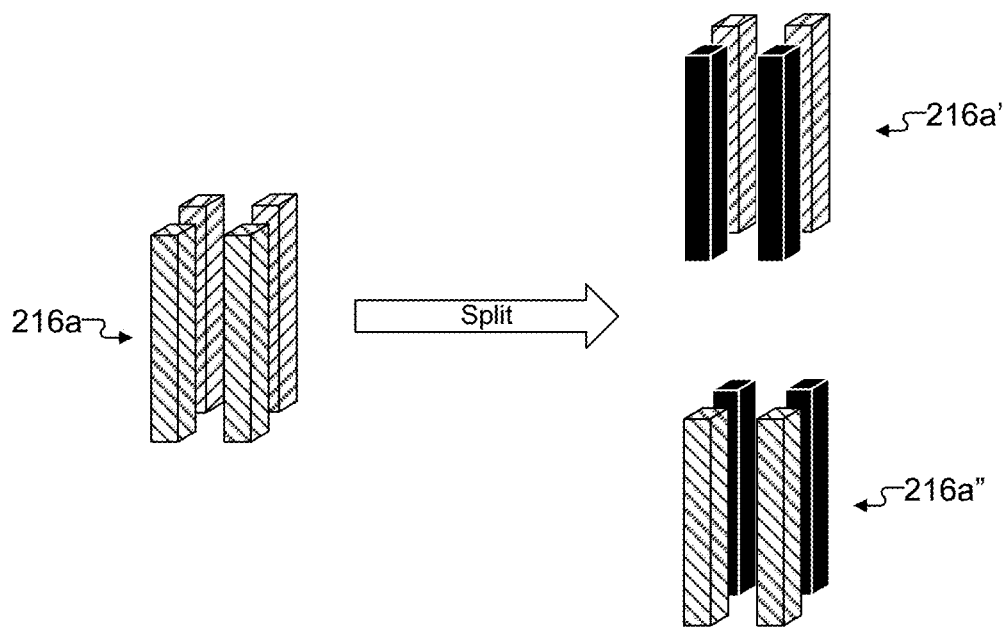
FIGS. 10A and 10B illustrate an example splitting of information during initial decoding in FIG. 9 in accordance with this disclosure.
Figure 10B:
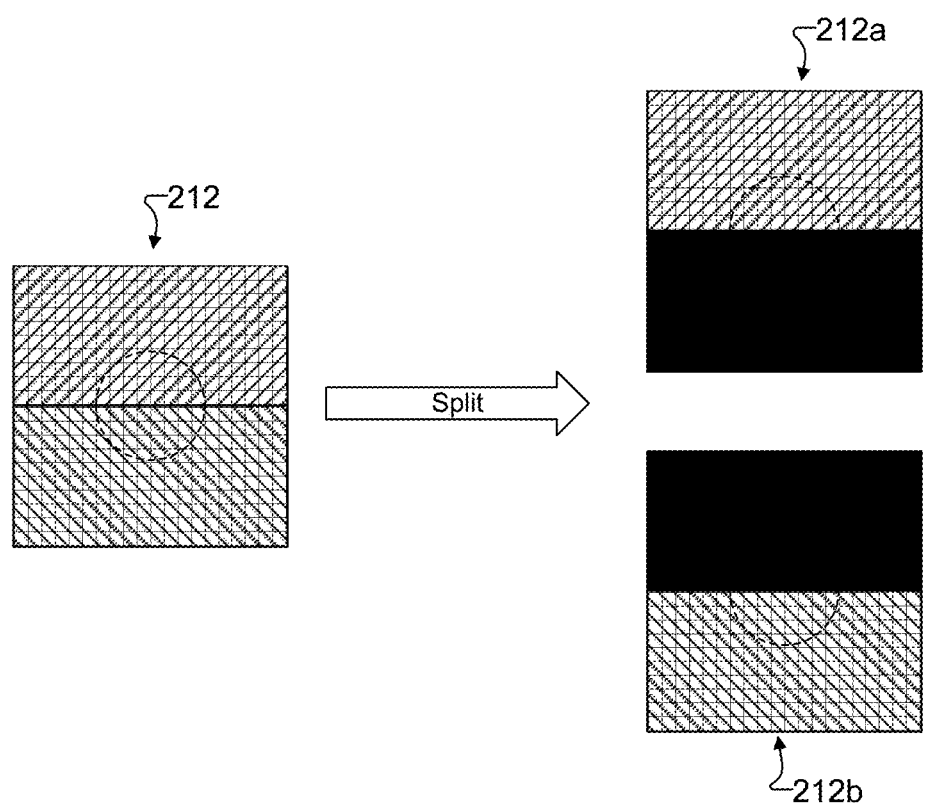

FIGS. 10A and 10B illustrate an example splitting of information during initial decoding in FIG. 9 in accordance with this disclosure. The splitting may be used, for example, with the collection 216a of semantic code vectors 218 and with the filled semantic mask 212. For ease of explanation, the splitting in FIGS. 10A and 10B may be performed by the electronic device 101 of FIG. 1. However, this may be done with any suitable device(s) and in any suitable system(s), such as when this is performed by the server 106 in FIG. 1 or in another system.

As shown in FIG. 10A, the collection 216a of semantic code vectors 218 is split by zeroing out or masking all semantic code vectors 218 except for the semantic code vector(s) 218 associated with one particular semantic class. This produces the masked collection 216a' of semantic code vectors. The collection 216a of semantic code vectors 218 is also split by zeroing out or masking all semantic code vectors 218 except for the semantic code vectors 218 associated with another particular semantic class. This produces the masked collection 216a" of semantic code vectors. The result here is that each masked collection 216a' and 216a" of semantic code vectors includes non-zero semantic code vectors for a single semantic class, while the masked collections 216a' and 216a" of semantic code vectors include non-zero semantic code vectors for different semantic classes. This allows each semantic class to be processed separately as described above.

As shown in FIG. 10B, a similar approach can be used to generate the masked versions 212a and 212b of the filled semantic mask 212. Here, each masked version 212a and 212b of the filled semantic mask 212 includes non-zero entries for a single semantic class, while the masked versions 212a and 212b of the filled semantic mask 212 include non-zero entries for different semantic classes. This also allows each semantic class to be processed separately as described above.

Although FIGS. 10A and 10B illustrate examples of splitting of information during initial decoding in FIG. 9, various changes may be made to FIGS. 10A and 10B. For instance, this example again assumes that there are only two semantic classes contained in the input image 208. If the input image 208 contains more than two semantic classes, the splitting of the collection 216a of semantic code vectors 218 may result in more than two masked collections being formed, and the splitting of the filled semantic mask 212 may result in more than two masked versions of the filled semantic mask 212 being formed.

FIG. 11 illustrates an example process for image decoding in the technique of FIGS. 2A, 2B, and 2C in accordance with this disclosure. More specifically, FIG. 11 illustrates an example process that can be performed using the image decoder 224 of FIG. 2C. For ease of explanation, the process of FIG. 11 may be performed by the electronic device 101 of FIG. 1. However, this process may be used with any suitable device(s) and in any suitable system(s), such as when the process is performed by the server 106 in FIG. 1 or in another system.

As shown in FIG. 11, each collection 216a-216b of semantic code vectors 218 and the initial image feature map 222 are provided to a residual block (ResBlock) processing operation 1102, which (as described below) supports a location- and class-wise adaptive instance normalization (AdaIN) technique and an upsampling operation. The adaptive instance normalization technique precisely applies contextual information to reconstruct the visual content in the one or more holes of the input image 208, rather than relying on convolution operations to do so in an imprecise fashion. The processing operation 1102 is performed multiple times, and each iteration of the processing operation 1102 increases the resolution of the results produced by the processing operation 1102. For example, each iteration of the processing operation 1102 may double the resolution of the processing operation's outputs. One example implementation of the processing operation 1102 is described below. The upsampling operation can be used to increase the resolution of the outputs of the processing operation 1102.

Note that the processing operation 1102 can be repeated multiple times. For example, the collection 216a of semantic code vectors 218 having the lowest scale (2×2 in this example) can be processed using the processing operation 1102, and the initial outputs of the processing operation 1102 can have double the resolution. The next collection 216b of semantic code vectors 218 having the next scale (4×4 in this example) can be processed using the processing operation 1102, and again the outputs of the processing operation 1102 can have double the resolution. This can continue until all collections of semantic code vectors 218 have been processed and the outputs of the processing operation 1102 have a desired final resolution.

The outputs of the processing operation 1102 represent feature maps, which are provided to a pixelization operation 1104 that converts the feature maps into RGB image data or other image data forming a raw output image 1106. For example, the pixelization operation 1104 may use a 3×3 or other convolution operation and a tanh( ) function to convert the feature maps into image data. The raw output image 1106 contains image data corresponding to all locations of the input image 208, including in one or more holes of the input image 208.

A blending operation 1108 combines the raw output image 1106 with the original input image 208 (which contains one or more holes) in order to generate the final output image 226. In this example, the blending operation 1108 uses an input image mask 1110, which is a mask that blocks blending of the one or more portions of the input image 208 associated with the one or more holes. The input image mask 1110 therefore allows blending of all portions of the input image 208 that are not being removed. The blending operation 1108 also uses a raw image mask 1112, which is a mask that allows blending of one or more portions of the raw output image 1106 contained within the one or more holes. In other words, the raw image mask 1112 may represent an inverse of the input image mask 1110. The raw image mask 1112 therefore allows blending of only those portions of the raw output image 1106 that are being used to fill in one or more holes in the input image 208 (thereby controlling what portion or portions of the raw output image 1106 are used as replacement content for the one or more holes in the input image 208). In this embodiment, the blending operation 1108 generally uses binary blending, where each pixel in the final output image 226 comes from either the input image 208 or the raw output image 1106. Note, however, that other forms of blending may also be used here.

Although FIG. 11 illustrates one example of a process for image decoding in the technique of FIGS. 2A, 2B, and 2C, various changes may be made to FIG. 11. For example, the specific masks 1110, 1112 shown here are based on the specific hole in the input image 208 and can vary for different input images.

Figure 12:
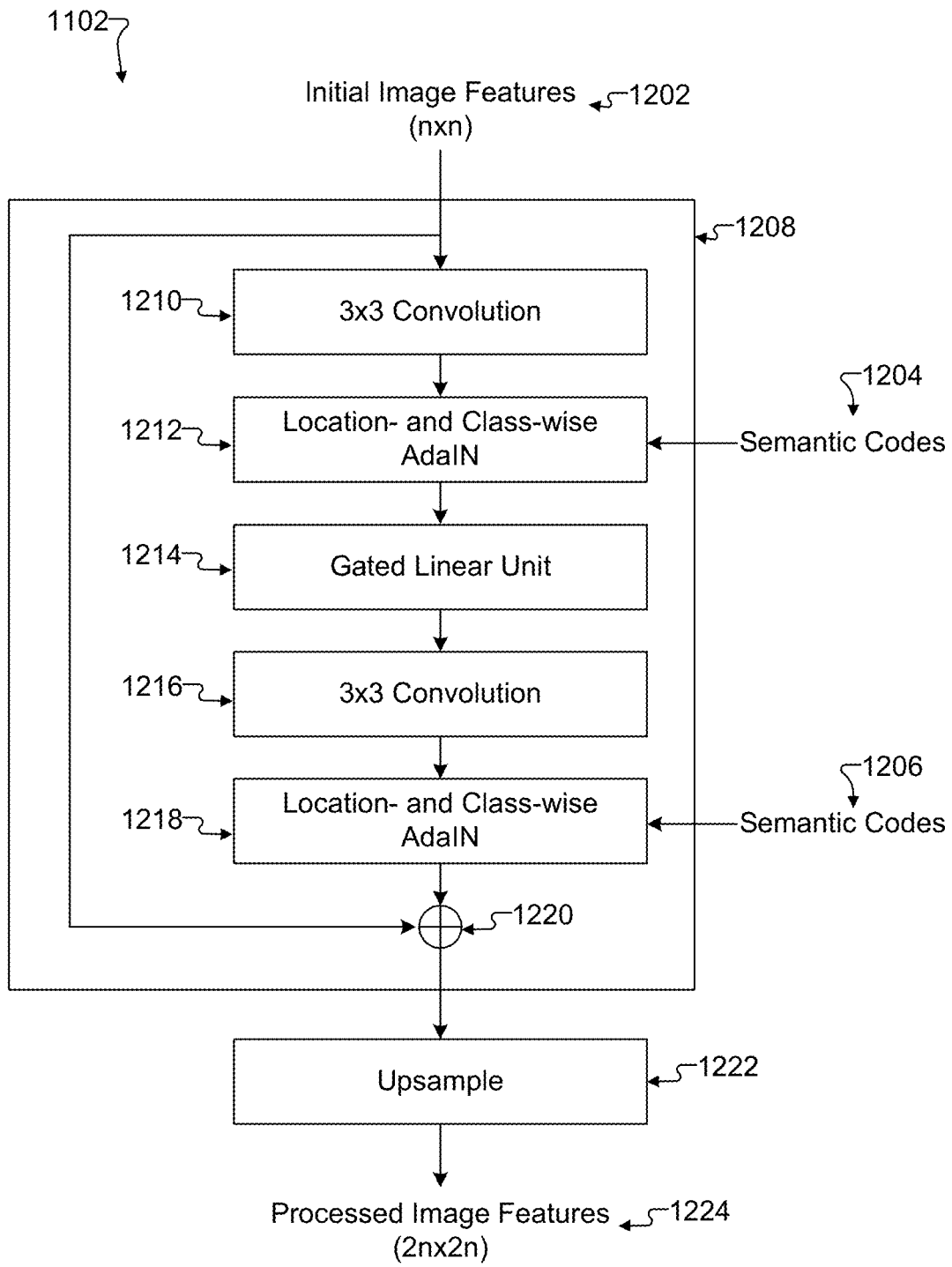
FIG. 12 illustrates an example process for generating a feature map for an output image during image decoding in FIG. 11 in accordance with this disclosure.

FIG. 12 illustrates an example process for generating a feature map for an output image during image decoding in FIG. 11 in accordance with this disclosure. More specifically, FIG. 12 illustrates an example process that can be performed during the processing operation 1102 of FIG. 11, such as when the processing operation 1102 is implemented using a neural network. For ease of explanation, the process of FIG. 12 may be performed by the electronic device 101 of FIG. 1. However, this process may be used with any suitable device(s) and in any suitable system(s), such as when the process is performed by the server 106 in FIG. 1 or in another system.

As shown in FIG. 12, the processing operation 1102 receives an initial set of image features 1202, a first set of semantic codes 1204, and a second set of semantic codes 1206. The initial set of image features 1202 may represent image features from the initial image feature map 222 during a first iteration of the processing operation 1102 or image features generated by a prior iteration of the processing operation 1102. A resolution of the initial set of image features 1202 here is defined generically as n×n, where the value of n can vary based on the iteration of the processing operation 1102. Each set of semantic codes 1204, 1206 includes the semantic codes represented by the semantic code vectors 218 for the collection being processed. As noted above, the collection 216a with the lowest scale may be processed during the first iteration of the processing operation 1102, and one or more other collections 216b may be processed during one or more subsequent iterations of the processing operation 1102. The same semantic codes can be represented by the sets of semantic codes 1204, 1206 here.

The initial set of image features 1202 is processed using a ResBlock operation 1208. More specifically, the initial set of image features 1202 is provided to a convolution operation 1210, which includes at least one convolutional layer that operates on the initial set of image features 1202. The convolution operation 1210 may apply a 3×3 convolution to the initial set of image features 1202, although other kernel sizes may be supported by the convolution operation 1210. The resulting feature map and the semantic codes 1204 are provided to a location- and class-wise adaptive instance normalization operation 1212, which applies an affine transformation to the semantic codes 1204 and normalizes the feature map based of the transformed semantic codes 1204. This helps to fuse the feature map for each semantic class with semantic information. One example implementation of the adaptive instance normalization operation 1212 is described below.

The resulting feature map from the location- and class-wise adaptive instance normalization operation 1212 is provided to a gated linear unit 1214, which operates to apply an activation function to the feature map from the location- and class-wise adaptive instance normalization operation 1212. This allows the gated linear unit 1214 to apply a non-linear transformation to the feature map. Note, however, that any other suitable activation functions may supported here, such as a rectified linear unit (ReLU) or a leaky rectified linear unit (leaky-ReLU).

The feature map from the gated linear unit 1214 is provided to another convolution operation 1216, which includes at least one convolutional layer that operates on the feature map from the gated linear unit 1214. The convolution operation 1216 may apply a 3×3 convolution to the feature map from the gated linear unit 1214, although other kernel sizes may be supported by the convolution operation 1216. The resulting feature map is provided to another location- and class-wise adaptive instance normalization operation 1218, which applies an affine transformation to the semantic codes 1206 and normalizes the feature map based of the transformed semantic codes 1206. Again, this helps to fuse the feature map for each semantic class with semantic information. One example implementation of the adaptive instance normalization operation 1218 is described below.

The feature map from the adaptive instance normalization operation 1218 is provided to an aggregation operation 1220, which combines the feature map from the adaptive instance normalization operation 1218 with the initial set of image features 1202. In a typical normalization operation, the normalization operation would wash some information from the input condition. In FIG. 12, the adaptive instance normalization operations 1212 and 1218 are used to fuse such information back into intermediate feature maps within the network. This is also why the same semantic codes are provided in the sets of semantic codes 1204 and 1206 to the adaptive instance normalization operations 1212 and 1218. In this way, the input condition (the semantic codes) are provided as inputs to the initial decoder 220, and the semantic codes are maintained via fusing using the adaptive instance normalization operations 1212 and 1218 in the image decoder 224.

The feature map from the aggregation operation 1220 is provided to an upsampling operation 1222, which upsamples the feature map from the aggregation operation 1220 in order to generate a set of processed image features 1224. The set of processed image features 1224 here has twice the resolution (2n×2n) compared to the initial set of image features 1202. As noted above, the processing operation 1102 can be repeated multiple times in order to continue increasing the resolution of the resulting set of processed image features 1224, where each subsequent execution of the processing operation 1102 can involve an additional collection of semantic code vectors 218 at a higher scale. Eventually, the last iteration of the processing operation 1102 produces a set of processed image features 1224 at the desired resolution.

Although FIG. 12 illustrates one example of a process for generating a feature map for an output image during image decoding in FIG. 11, various changes may be made to FIG. 12. For example, one or more instances of a location- and class-wise adaptive instance normalization operation may be used in any other suitable manner to generate a feature map.

Figure 13:
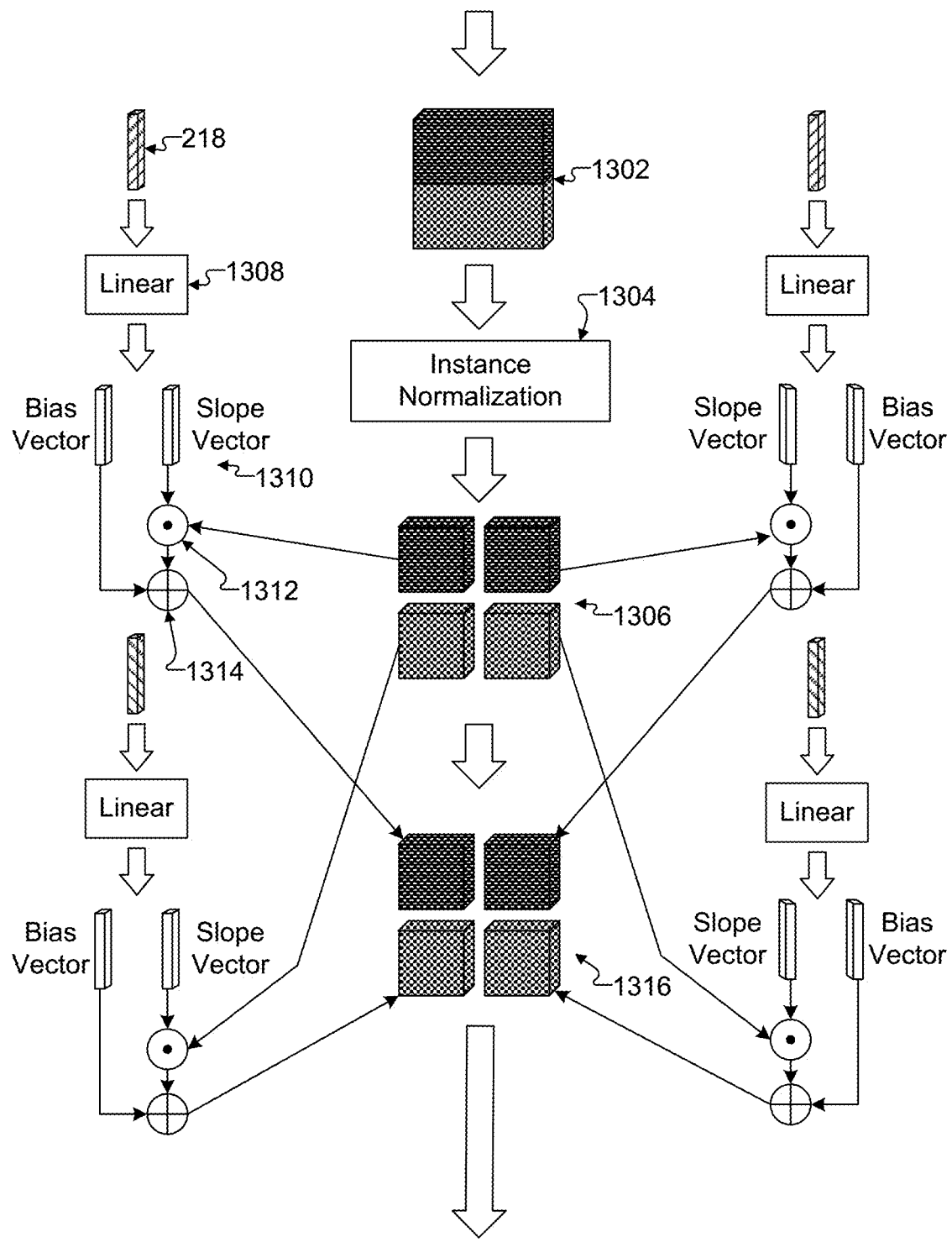
FIG. 13 illustrates an example process for performing location- and class-wise adaptive instance normalization during generation of the feature map in FIG. 12 in accordance with this disclosure.

FIG. 13 illustrates an example process for performing location- and class-wise adaptive instance normalization during generation of the feature map in FIG. 12 in accordance with this disclosure. More specifically, FIG. 13 illustrates an example process that can be performed during the location- and class-wise adaptive instance normalization operations 1212 and 1218 of FIG. 12. For ease of explanation, the process of FIG. 13 may be performed by the electronic device 101 of FIG. 1. However, this process may be used with any suitable device(s) and in any suitable system(s), such as when the process is performed by the server 106 in FIG. 1 or in another system.

As shown in FIG. 13, an input feature map 1302 is received by the adaptive instance normalization operation 1212 or 1218. The input feature map 1302 may be generated by the convolution operation 1210 or the convolution operation 1216. The input feature map 1302 is provided to an instance normalization operation 1304, which performs instance or contrast normalization on the input feature map 1302 and separates the input feature map 1302 into different sub-feature maps 1306. Each sub-feature map 1306 is associated with a different one of the semantic code vectors 218 being processed in the current collection 216a-216b of semantic code vectors 218.

Each semantic code vector 218 being processed is provided to a linear transformation operation 1308, which operates to produce a set of affine parameters 1310 for that semantic code vector 218. In this example, the linear transformation operation 1308 applies an affine transformation to each semantic code vector 218, and each set of affine parameters 310 includes a slope vector and a bias vector associated with the semantic code vectors 218. In an affine transformation, the slope vector plays the role of scaling a feature in a feature space, and the bias vector plays the role of shifting a feature in the feature space. Note that while multiple linear transformation operations 1308 are shown here, a single linear transformation operation may be used sequentially here.

For each semantic code vector 218 being processed, an associated sub-feature map 1306 is multiplied by the slope vector using a multiplier operation 1312, and the resulting product is added to the bias vector using an addition operation 1314. This produces a set of transformed sub-feature maps 1316, where the $i^{th}$ transformed sub-feature map 1316 can be expressed as follows:

$$\text{slope\_vector}_i \times \text{sub-feature\_map}_i + \text{bias\_vector}_i$$

The resulting collection of sub-feature maps 1316 can be provided as an output feature map from the adaptive instance normalization operation 1212 or 1218 to the gated linear unit 1214 or aggregation operation 1220. In this way, each adaptive instance normalization operation 1212 or 1218 can estimate and apply specific slope and bias vectors for different chunks of the input image 208 and for different semantic classes of image data in the input image 208.

Although FIG. 13 illustrates one example of a process for performing location- and class-wise adaptive instance normalization during generation of the feature map in FIG. 12, various changes may be made to FIG. 13. For example, the approach in FIG. 13 is shown as involving the processing of the collection 216a of semantic code vectors 218. However, the approach in FIG. 13 can also be easily expanded to process more semantic code vectors 218 in one or more additional collections of semantic code vectors 218, such as the collection 216b.

FIGS. 14A, 14B, and 14C illustrate first example results that may be obtained using precise image inpainting in accordance with this disclosure. Dashed lines in FIGS. 14A, 14B, and 14C are used here to help identify boundaries between semantic classes and do not form part of the images here. As shown in FIG. 14A, an image 1402 is being presented on an electronic device, and a user has used an electronic pen 1404 or his or her finger to define an area 1406 of the image 1402 to be removed. The area 1406 may, for instance, include an unwanted person or other object in the image 1402. The electronic device has also displayed one or more semantic classes 1408 that have been identified by the electronic device as being included in the image 1402. The one or more semantic classes 1408 may be identified in any suitable manner, such as by using the automatic semantic segmentation model 302.

As shown in FIG. 14B, the user has defined one or more regions 1410 of the area 1406 as being associated with specific ones of the semantic classes 1408. For example, the user may select the "ground" semantic class 1408 and define the central region 1410 in the area 1406 as being associated with that semantic class 1408. The user may also select the "ground" semantic class 1408 and define the upper and lower regions 1410 in the area 1406 as being associated with that semantic class 1408. If multiple semantic classes 1408 are selected by the user and used to define multiple regions 1410 in the defined area 1406, this may also allow the user to define one or more boundaries 1412 between different semantic classes 1408 in the defined area 1406. Note, however, that the user may define the region(s) 1410 (and optionally one or more boundaries 1412 if regions 1410 of different semantic classes 1408 are defined) in any other desired manner. Overall, the user here can define both (i) the semantic class or classes 1408 that should be used to fill the defined area 1406 and (ii) the distribution of the semantic class or classes 1408 within the defined area 1406.

As shown in FIG. 14C, the electronic device has used the distribution of the semantic class or classes 1408 in the defined area 1406 to generate a final output image 1414. As can be seen here, the area 1406 has been filled with replacement content of both the "ground" and "lawn" semantic classes in the specific arrangement as defined by the user. Thus, the techniques described above can be used to more accurately generate replacement content for the defined area 1406 so that the final output image 1414 contains little or no ambiguity artifacts.

Although FIGS. 14A, 14B, and 14C illustrate a first example of results that may be obtained using precise image inpainting, various changes may be made to FIGS. 14A, 14B, and 14C. For example, the image 1402 and the area 1406 being removed here are for illustration only. Also, while the regions 1410 and the boundaries 1412 are described here as being defined by a user, the regions 1410 and the boundaries 1412 may be defined by the automatic layout prediction model 402 or in any other suitable automated manner (at which point the user may optionally change the regions 1410 and the boundaries 1412 if desired).

Figure 15A:
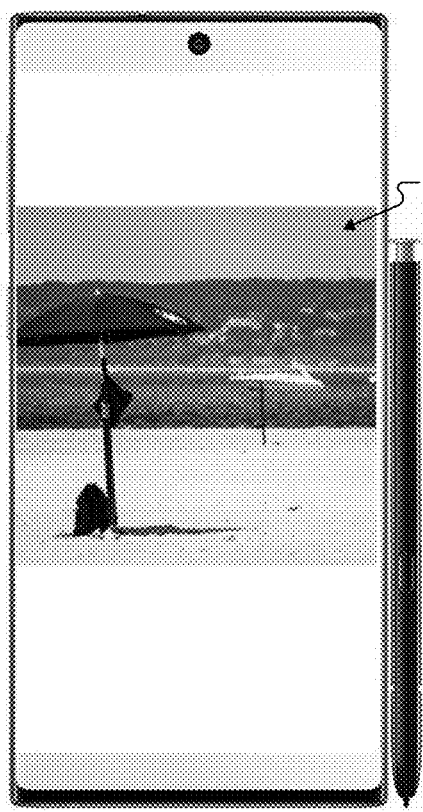
FIGS. 15A, 15B, 15C, and 15D illustrate second example results that may be obtained using precise image inpainting in accordance with this disclosure.
Figure 15B:
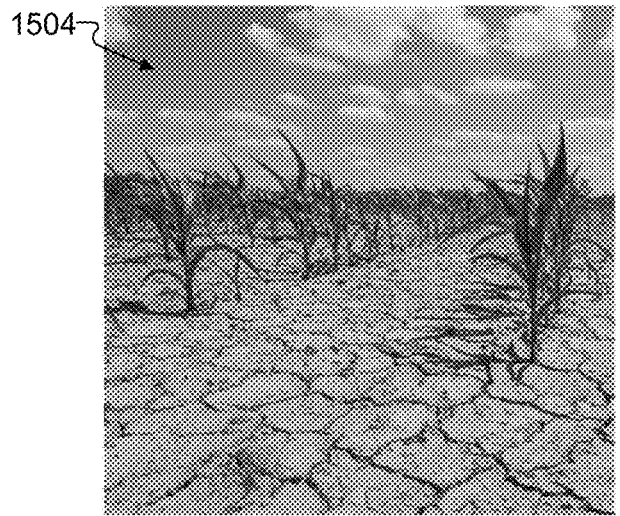

FIGS. 15A, 15B, 15C, and 15D illustrate second example results that may be obtained using precise image inpainting in accordance with this disclosure. Again, dashed lines in FIGS. 15A, 15B, 15C, and 15D are used here to help identify boundaries between semantic classes and do not form part of the images here. As shown in FIG. 15A, an image 1502 is being presented on an electronic device, and a user may indicate that the user wishes to replace the background of the image 1502. The user may, for instance, indicate that an image 1504 in FIG. 15B should be used as a template to replace the background of the image 1502.

Figure 15C:
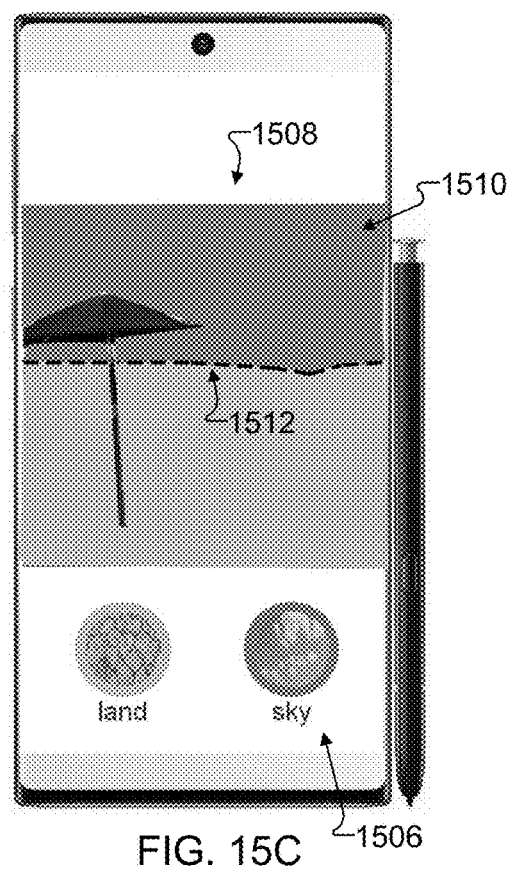
Figure 15D:
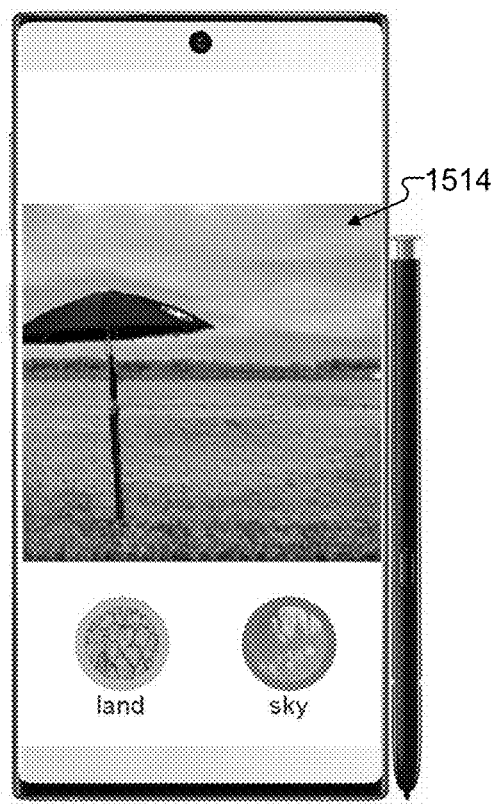

As shown in FIG. 15C, the electronic device can use the template image 1504 to automatically (i) identify one or more semantic classes 1506 to be used to replace the background of the image 1502 and (ii) define one or more areas 1508 of the image 1502 that contain one or more regions 1510 associated with the semantic class(es) 1506 and optionally one or more boundaries 1512 between regions 1510 of different semantic classes 1506. The user may choose to alter or change how the one or more areas 1508 were defined. As shown in FIG. 15D, once accepted, the electronic device can generate a final output image 1514 in which the background of the image 1502 has been removed. Again, the techniques described above can be used to more accurately generate replacement content for the defined area(s) 1508 so that the final output image 1514 contains little or no ambiguity artifacts.

Although FIGS. 15A, 15B, 15C, and 15D illustrate a second example of results that may be obtained using precise image inpainting, various changes may be made to FIGS. 15A, 15B, 15C, and 15D. For example, the image 1502 and the area(s) 1508 being removed here are for illustration only. Also, while the regions 1510 and the boundaries 1512 are described here as being defined automatically, the regions 1510 and the boundaries 1512 may be defined by the user or in any other suitable manner.

Figure 16:
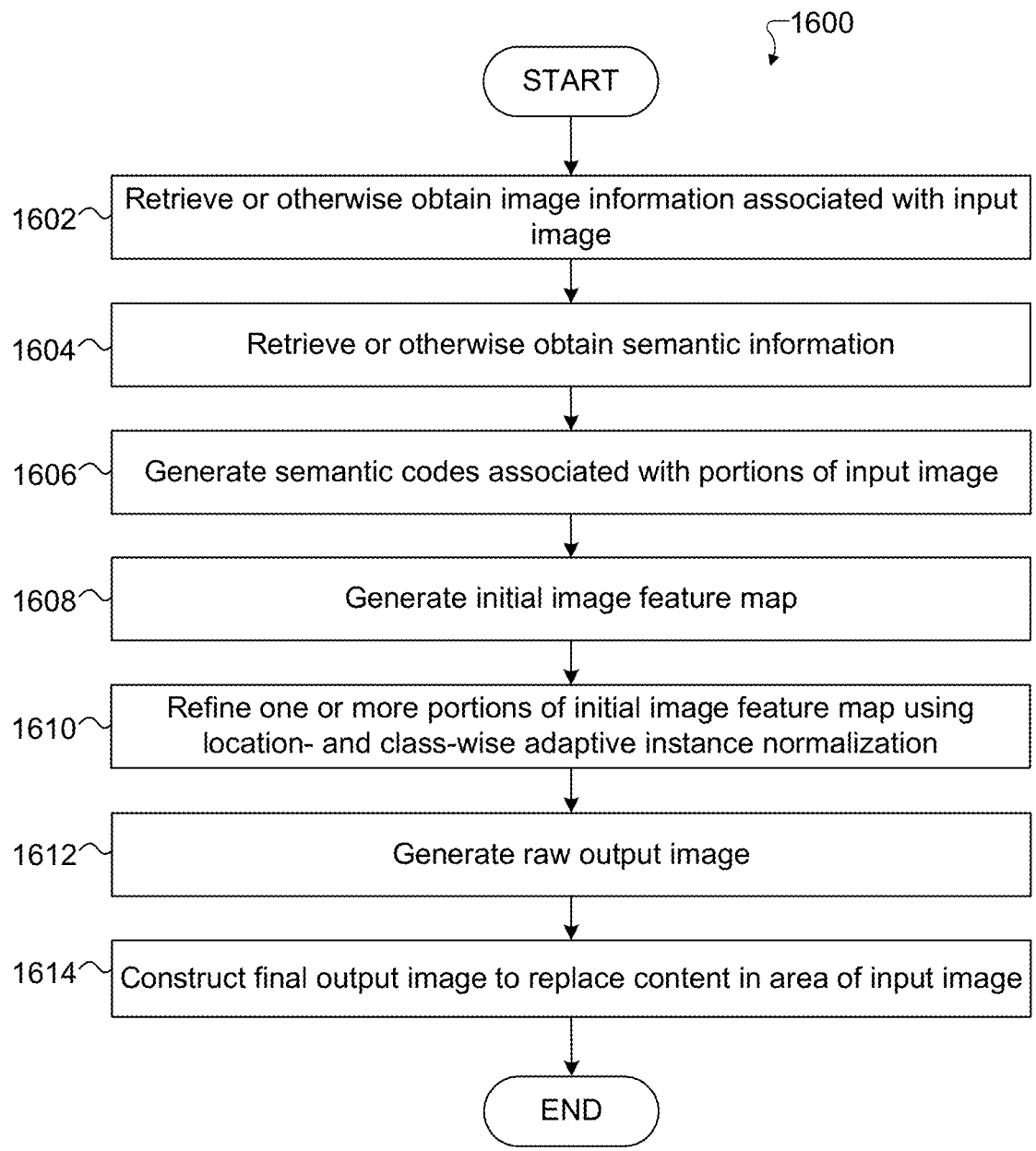
FIG. 16 illustrates an example method for precise image inpainting to remove unwanted content from digital images in accordance with this disclosure.

FIG. 16 illustrates an example method 1600 for precise image inpainting to remove unwanted content from digital images in accordance with this disclosure. For ease of explanation, the method 1600 of FIG. 16 may be performed by the electronic device 101 of FIG. 1. However, the method 1600 may be used with any suitable device(s) and in any suitable system(s), such as when the method 1600 is performed by the server 106 in FIG. 1 or in another system.

As shown in FIG. 16, image information associated with an input image is retrieved or otherwise obtained at an electronic device at step 1602. This may include, for example, the processor 120 of the electronic device 101 retrieving or otherwise obtaining an input image 208, such as from an imaging sensor 180 or memory 130 of the electronic device 101. The image information can include an identification of at least one hole or other area to be removed and replaced with other content, such as in order to remove one or more unwanted objects or a background in the input image 208. Semantic information associated with the input image is retrieved or otherwise obtained at the electronic device at step 1604. This may include, for example, the processor 120 of the electronic device 101 generating or otherwise obtaining a semantic mask 210 and a filled semantic mask 212 associated with the input image 208. Semantic information generally refers to information related to the semantic content of the input image 208. As described above, the semantic information may include or identify one or more semantic classes and a semantic class distribution of each semantic class within the area(s) of the input image 208. A semantic class distribution refers to the distribution of semantic class labels on an image plane, meaning the semantic class distribution identifies where semantic class labels are associated with different semantic contents in the input image 208. The semantic mask 210 and the filled semantic mask 212 may be produced automatically or with user input.

Semantic codes associated with portions of the input image are generated at step 1606. This may include, for example, the processor 120 of the electronic device 101 providing the input image 208, semantic mask 210, and filled semantic mask 212 to the semantic encoder 214 in order to generate multiple collections 216a-216b of semantic code vectors 218. For each portion of the input image 208 that does not include at least part of a hole or other area being removed, a semantic code vector 218 for that portion of the image 208 can be generated in each collection 216a-216b. For each portion of the input image 208 that does include at least part of a hole or other area being removed, a semantic class associated with that portion of the input image 208 can be identified (such as by using the filled semantic mask 212), and a semantic code vector 218 for that portion of the image 208 can be generated in each collection 216a-216b based on one or more neighboring semantic code vectors 218 associated with the same identified semantic class.

An initial image feature map is generated at step 1608. This may include, for example, the processor 120 of the electronic device 101 providing at least one collection 216a-216b of semantic code vectors 218 and the filled semantic mask 212 to the initial decoder 220 in order to generate the initial image feature map 222. In some cases, the processor 120 can generate different raw initial image feature maps 906 and 914 for different ones of the semantic classes and then aggregate or otherwise combine the raw initial image feature maps 906 and 914 in order to generate the initial image feature map 222.

One or more portions of the initial image feature map are refined using location- and class-wise adaptive instance normalization at step 1610. This may include, for example, the processor 120 of the electronic device 101 providing the collections 216a-216b of semantic code vectors 218 and the initial image feature map 222 to the image decoder 224. This may also include the processor 120 of the electronic device 101 processing the initial image feature map 222 and the collections 216a-216b of semantic code vectors 218 using multiple iterations of the processing operation 1102. During this step, a feature map input to the processing operation 1102 can be divided into multiple sub-feature maps 1306, where each sub-feature map 1306 is associated with a different semantic code vector 218 being processed in a current iteration. Bias and slope vectors (affine parameters 1310) can be generated for each semantic code vector 218, and each sub-feature map 1306 can be modified using the bias and slope vectors for the semantic code vector 218 associated with that sub-feature map 1306 to generate transformed sub-feature maps 1316. A raw output image is generated at step 1612. This may include, for example, the processor 120 of the electronic device 101 providing the feature map generated by the final iteration of the processing operation 1102 to the pixelization operation 1104, which converts the feature map into image data forming a raw output image 1106.

A final output image is constructed to replace content in the area of the input image at step 1614. This may include, for example, the processor 120 of the electronic device 101 blending the raw output image 1106 with the input image 208 using suitable masks 1110 and 1112. The resulting final output image 226 can replace the area(s) of the input image 208 with suitable replacement content.

Although FIG. 16 illustrates one example of a method 1600 for precise image inpainting to remove unwanted content from digital images, various changes may be made to FIG. 16. For example, while shown as a series of steps, various steps in FIG. 16 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. An inpainting method comprising:
   obtaining image information at an electronic device, wherein the image information identifies an area within an image to be replaced;
   obtaining, using the electronic device, semantic information associated with semantic content of the image, the semantic information including a plurality of semantic classes and a semantic class distribution for each semantic class of the plurality of semantic classes;
   generating semantic codes associated with different portions of the image based on the image information and the semantic information; and
   generating replacement image content for the area within the image based on the semantic codes.

2. The inpainting method of claim 1, wherein generating the semantic codes comprises:
   for each portion of the image that does not include at least part of the area within the image, generating a semantic code vector for that portion of the image; and
   for each portion of the image that does include at least part of the area within the image, (i) identifying a semantic class of the plurality of semantic classes associated with that portion of the image and (ii) generating a semantic code vector for that portion of the image based on one or more neighboring semantic code vectors associated with that identified semantic class.

3. The inpainting method of claim 1, further comprising:
   generating a first feature map of a first semantic class of the plurality of semantic classes, the first feature map masked based on one or more portions of a filled semantic mask associated with the first semantic class;
   generating a second feature map of a second semantic class of the plurality of semantic classes, the second feature map masked based on one or more portions of the filled semantic mask associated with the second semantic class; and
   generating an initial image feature map based on aggregating the first and second feature maps.

4. The inpainting method of claim 3, wherein:
   the first feature map is based on a first subset of semantic code vectors, the first subset of semantic code vectors including (i) semantic code vectors for one or more portions of the image containing image data of the first semantic class and (ii) masked semantic code vectors for one or more portions of the image containing image data of the second semantic class; and
   the second feature map is based on a second subset of semantic code vectors, the second subset of semantic code vectors including (i) semantic code vectors for the one or more portions of the image containing the image data of the second semantic class and (ii) masked semantic code vectors for the one or more portions of the image containing the image data of the first semantic class.

5. The inpainting method of claim 3, further comprising:
   refining one or more regions of the initial image feature map for each semantic class via fusing with the semantic information through location- and class-wise adaptive instance normalization in order to generate a raw output image;
   wherein generating the replacement image content for the area within the image comprises blending the raw output image and the image.

6. The inpainting method of claim 5, wherein the location- and class-wise adaptive instance normalization comprises:
   dividing a feature map into multiple sub-feature maps, each sub-feature map associated with a different semantic code vector, each semantic code vector representing one of the semantic codes;
   generating bias and slope vectors for each semantic code vector; and
   modifying each sub-feature map using the bias and slope vectors for the semantic code vector associated with that sub-feature map to generate transformed sub-feature maps.

7. The inpainting method of claim 1, wherein:
   the semantic codes are based on (i) the image, (ii) a semantic mask with a hole associated with the area within the image, and (iii) a filled semantic mask with the hole filled with estimated semantic class labels; and
   generating the replacement image content for the area within the image comprises:
      generating an initial image feature map associated with the image, the initial image feature map based on (i) the semantic codes and (ii) the filled semantic mask; and
      generating a final output image associated with the image, the final output image based on (i) the semantic codes and (ii) the initial image feature map.

8. An apparatus comprising:
   at least one processor configured to:
      obtain image information, wherein the image information identifies an area within an image to be replaced;
      obtain semantic information associated with semantic content of the image, the semantic information including a plurality of semantic classes and a semantic class distribution for each semantic class of the plurality of semantic classes;

generate semantic codes associated with different portions of the image based on the image information and the semantic information; and
generate replacement image content for the area within the image based on the semantic codes.

9. The apparatus of claim 8, wherein, to generate the semantic codes, the at least one processor is configured to:
for each portion of the image that does not include at least part of the area within the image, generate a semantic code vector for that portion of the image; and
for each portion of the image that does include at least part of the area within the image, (i) identify a semantic class of the plurality of semantic classes associated with that portion of the image and (ii) generate a semantic code vector for that portion of the image based on one or more neighboring semantic code vectors associated with that identified semantic class.

10. The apparatus of claim 8, wherein the at least one processor is further configured to:
generate a first feature map of a first semantic class of the plurality of semantic classes, the first feature map masked based on one or more portions of a filled semantic mask associated with the first semantic class;
generate a second feature map of a second semantic class of the plurality of semantic classes, the second feature map masked based on one or more portions of the filled semantic mask associated with the second semantic class; and
generate an initial image feature map based on aggregating the first and second feature maps.

11. The apparatus of claim 10, wherein:
the first feature map is based on a first subset of semantic code vectors, the first subset of semantic code vectors including (i) semantic code vectors for one or more portions of the image containing image data of the first semantic class and (ii) masked semantic code vectors for one or more portions of the image containing image data of the second semantic class; and
the second feature map is based on a second subset of semantic code vectors, the second subset of semantic code vectors including (i) semantic code vectors for the one or more portions of the image containing the image data of the second semantic class and (ii) masked semantic code vectors for the one or more portions of the image containing the image data of the first semantic class.

12. The apparatus of claim 10, wherein:
the at least one processor is further configured to refine one or more regions of the initial image feature map for each semantic class via fusing with the semantic information through location- and class-wise adaptive instance normalization in order to generate a raw output image; and
to generate the replacement image content for the area within the image, the at least one processor is configured to blend the raw output image and the image.

13. The apparatus of claim 12, wherein, to perform the location and class-wise adaptive instance normalization, the at least one processor is configured to:
divide a feature map into multiple sub-feature maps, each sub-feature map associated with a different semantic code vector, each semantic code vector representing one of the semantic codes;
generate bias and slope vectors for each semantic code vector; and
modify each sub-feature map using the bias and slope vectors for the semantic code vector associated with that sub-feature map to generate transformed sub-feature maps.

14. The apparatus of claim 8, wherein:
the semantic codes are based on (i) the image, (ii) a semantic mask with a hole associated with the area within the image, and (iii) a filled semantic mask with the hole filled with estimated semantic class labels; and
to generate the replacement image content for the area within the image, the at least one processor is configured to:
generate an initial image feature map associated with the image, the initial image feature map based on (i) the semantic codes and (ii) the filled semantic mask; and
generate a final output image associated with the image, the final output image based on (i) the semantic codes and (ii) the initial image feature map.

15. A non-transitory computer readable medium containing instructions that when executed cause at least one processor to:
obtain image information, wherein the image information identifies an area within an image to be replaced;
obtain semantic information associated with semantic content of the image, the semantic information including a plurality of semantic classes and a semantic class distribution for each semantic class of the plurality of semantic classes;
generate semantic codes associated with different portions of the image based on the image information and the semantic information; and
generate replacement image content for the area within the image based on the semantic codes.

16. The non-transitory computer readable medium of claim 15, wherein the instructions that cause the at least one processor to generate the semantic codes comprise instructions that cause the at least one processor to:
for each portion of the image that does not include at least part of the area within the image, generate a semantic code vector for that portion of the image; and
for each portion of the image that does include at least part of the area within the image, (i) identify a semantic class of the plurality of semantic classes associated with that portion of the image and (ii) generate a semantic code vector for that portion of the image based on one or more neighboring semantic code vectors associated with that identified semantic class.

17. The non-transitory computer readable medium of claim 15, further containing instructions when executed cause the at least one processor to:
generate a first feature map of a first semantic class of the plurality of semantic classes, the first feature map masked based on one or more portions of a filled semantic mask associated with the first semantic class;
generate a second feature map of a second semantic class of the plurality of semantic classes, the second feature map masked based on one or more portions of the filled semantic mask associated with the second semantic class; and
generate an initial image feature map based on aggregating the first and second feature maps.

18. The non-transitory computer readable medium of claim 17, wherein:
the first feature map is based on a first subset of semantic code vectors, the first subset of semantic code vectors including (i) semantic code vectors for one or more portions of the image containing image data of the first semantic class and (ii) masked semantic code vectors for one or more portions of the image containing image data of the second semantic class; and the second feature map is based on a second subset of semantic code vectors, the second subset of semantic code vectors including (i) semantic code vectors for the one or more portions of the image containing the image data of the second semantic class and (ii) masked semantic code vectors for the one or more portions of the image containing the image data of the first semantic class.

19. The non-transitory computer readable medium of claim 17, further containing instructions that when executed cause the at least one processor to refine one or more regions of the initial image feature map for each semantic class via fusing with the semantic information through location- and class-wise adaptive instance normalization in order to generate a raw output image;

wherein the instructions that cause the at least one processor to generate the replacement image content for the area within the image comprise instructions that cause the at least one processor to blend the raw output image and the image.

20. The non-transitory computer readable medium of claim 19, wherein the location- and class-wise adaptive instance normalization comprises:

dividing a feature map into multiple sub-feature maps, each sub-feature map associated with a different semantic code vector, each semantic code vector representing one of the semantic codes;

generating bias and slope vectors for each semantic code vector; and modifying each sub-feature map using the bias and slope vectors for the semantic code vector associated with that sub-feature map to generate transformed sub-feature maps.

21. The non-transitory computer readable medium of claim 15, wherein:

the semantic codes are based on (i) the image, (ii) a semantic mask with a hole associated with the area within the image, and (iii) a filled semantic mask with the hole filled with estimated semantic class labels; and the instructions that cause the at least one processor to generate the replacement image content for the area within the image comprise instructions that cause the at least one processor to:

generate an initial image feature map associated with the image, the initial image feature map based on (i) the semantic codes and (ii) the filled semantic mask; and generate a final output image associated with the image, the final output image based on (i) the semantic codes and (ii) the initial image feature map.

* * * * *